(12) United States Patent
Njiende T. et al.

(10) Patent No.: US 10,498,245 B2
(45) Date of Patent: Dec. 3, 2019

(54) INTEGRATED MAGNETIC COMPONENT

(71) Applicant: DET International Holding Limited, Grand Cayman (KY)

(72) Inventors: Hugues Douglas Njiende T., Paderborn (DE); Sergey Tikhonov, Soest (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 0 days.

(21) Appl. No.: 15/239,134

(22) Filed: Aug. 17, 2016

(65) Prior Publication Data
US 2017/0054378 A1  Feb. 23, 2017

(30) Foreign Application Priority Data
Aug. 18, 2015 (EP) .................... 15181351

(51) Int. Cl.
*H01F 27/40* (2006.01)
*H02M 3/335* (2006.01)
(Continued)

(52) U.S. Cl.
CPC .......... *H02M 3/33546* (2013.01); *H01F 3/10* (2013.01); *H01F 3/14* (2013.01);
(Continued)

(58) Field of Classification Search
CPC ............... H02M 1/42; H02M 3/33546; H02M 2001/0058; H02M 3/33569; H02M 3/337;
(Continued)

(56) References Cited

U.S. PATENT DOCUMENTS 5,726,615 A * 3/1998 Bloom ................. H01F 27/255
   336/178
6,344,979 B1  2/2002 Huang et al.
(Continued)

FOREIGN PATENT DOCUMENTS

CN   101308724 A   11/2008
CN   102064699 A   5/2011
(Continued)

OTHER PUBLICATIONS

European Search Report for EP application No. 15181351.6.2, dated Mar. 3, 2016.
(Continued)

*Primary Examiner* — Jeffrey A Gblende
*Assistant Examiner* — Lorena D Bruner
(74) *Attorney, Agent, or Firm* — Vector IP Law Group LLC; Robert S. Babayi

(57) ABSTRACT

The invention relates to an integrated magnetic component for a switched mode power converter, which includes a transformer with two transformer core elements (E2, E3) and at least one choke core element (E1, E4). Each core element (E1, E2, E3, E4) comprises two outer legs (120a, 120b) and a flange (122) which connects the outer legs (120a, 120b) to form U-like core elements. Each choke core element (E1, E4) abuts a flange (122) of one of the transformer core elements (E2, E3). The integrated magnetic component (103) includes a first choke winding (123) arranged on a leg (121.1) of a choke core element (E1) and a second choke winding (124) arranged on another leg (121.4) of a choke core element (E4), where one of a primary (P1, P2) or a secondary winding (S1, S2) of the transformer is connected between the choke windings (123, 124) and where all windings (P1, P2, S1, S2, 123, 124) are
(Continued)

interconnected to reduce core losses by flux compensation in order to increase power density.

16 Claims, 10 Drawing Sheets

(51) Int. Cl.
*H01F 3/14* (2006.01)
*H01F 27/38* (2006.01)
*H01F 27/28* (2006.01)
*H01F 41/02* (2006.01)
*H02M 1/42* (2007.01)
*H01F 3/10* (2006.01)
*H01F 30/04* (2006.01)
*H01F 30/10* (2006.01)
*H02M 3/337* (2006.01)
*H02M 1/00* (2006.01)

(52) U.S. Cl.
CPC ......... *H01F 27/2823* (2013.01); *H01F 27/38* (2013.01); *H01F 30/04* (2013.01); *H01F 30/10* (2013.01); *H01F 41/02* (2013.01); *H02M 1/42* (2013.01); *H01F 27/40* (2013.01); *H02M 3/337* (2013.01); *H02M 3/33569* (2013.01); *H02M 2001/0058* (2013.01); *Y02B 70/1433* (2013.01); *Y02B 70/1491* (2013.01)

(58) Field of Classification Search
CPC .............. Y02B 70/126; Y02B 70/1433; Y02B 70/1491; H01F 27/2823; H01F 27/38; H01F 27/40; H01F 3/14; H01F 41/02; H01F 27/28; H05K 7/00; H05K 1/18

USPC .................................................. 336/180–185
See application file for complete search history.

(56) References Cited

U.S. PATENT DOCUMENTS

| 2007/0145830 | A1 | 6/2007 | Lee et al. |
| 2008/0224809 | A1 | 9/2008 | Zhang et al. |
| 2009/0295524 | A1* | 12/2009 | Silva ........................ H01F 3/10 336/170 |
| 2011/0255321 | A1 | 10/2011 | Figge et al. |
| 2012/0176756 | A1* | 7/2012 | Gailus ................ H01R 13/6633 361/752 |
| 2013/0343091 | A1* | 12/2013 | Njiende T. .............. H01F 30/06 363/16 |
| 2014/0000974 | A1 | 1/2014 | Odenaal et al. |

FOREIGN PATENT DOCUMENTS

| CN | 103515066 A | 1/2014 |
| CN | 103595367 A | 2/2014 |
| DE | 10 2009 013 A1 | 9/2010 |
| EP | 2299456 A1 | 3/2011 |
| JP | 2010-171225 A | 8/2010 |
| WO | 1999/20422 | 6/1999 |
| WO | 2011/135424 A2 | 11/2011 |

OTHER PUBLICATIONS

European Search Report dated Dec. 1, 2017 for EP Patent Application No. 17179848.1 (14 pages).
Chinese Office Action, dated Jun. 6, 2019, 15 pages.

* cited by examiner

150

250

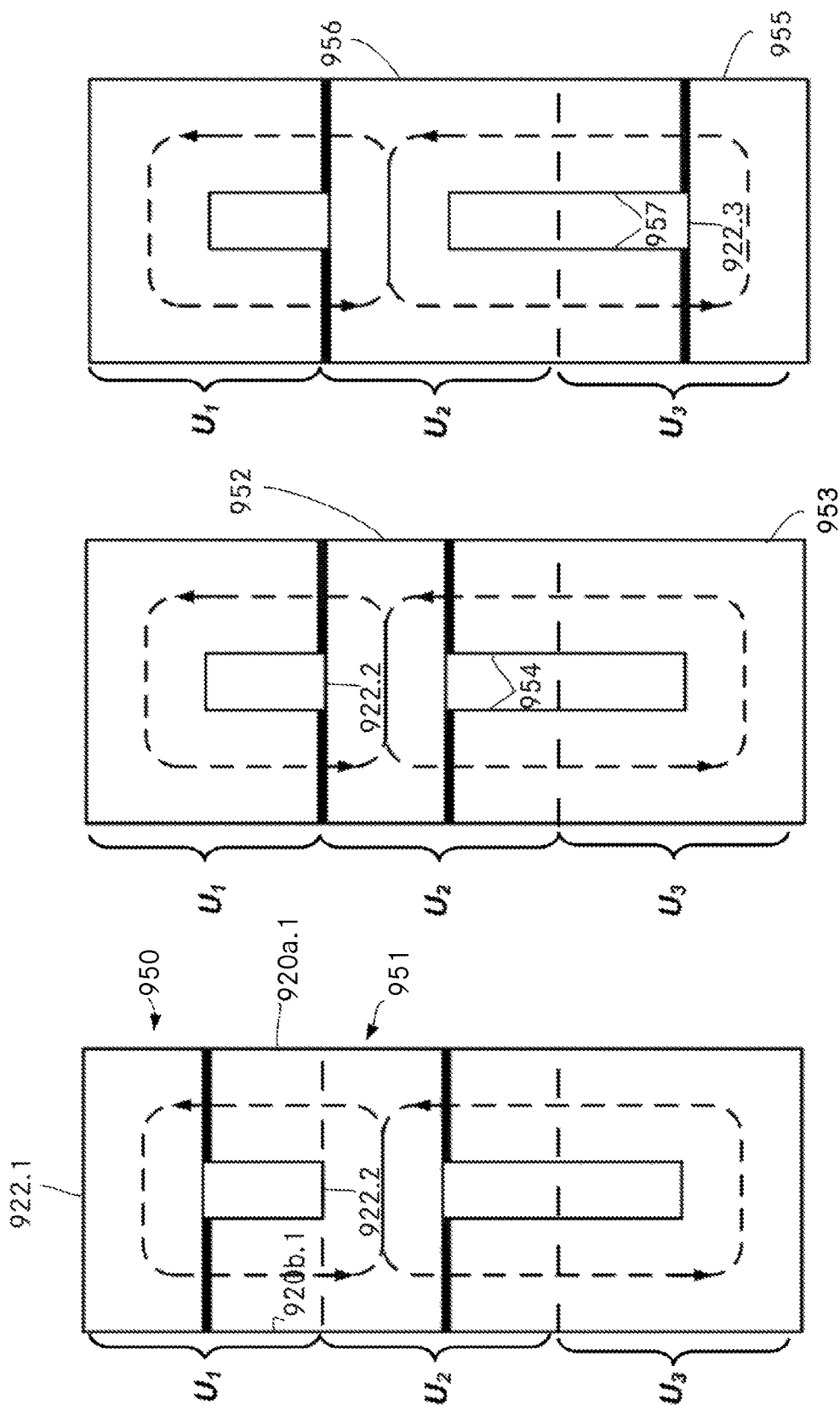

INTEGRATED MAGNETIC COMPONENT

TECHNICAL FIELD

The invention relates to an integrated magnetic component for a switched mode power converter. The integrated magnetic component includes a transformer which comprises two transformer core elements. The integrated magnetic component also includes at least one choke core element. Each of said core elements comprises a first and a second outer leg and a flange which connects the outer legs to form U-like core elements. The transformer core elements are arranged to form an O-like core element. Each choke core element abuts a flange of one of the transformer core elements. The transformer further comprises a primary winding and a secondary winding which are arranged on a leg of the transformer core elements. In addition, the transformer includes a first air gap which is arranged in a flux path between the transformer core elements. The integrated magnetic component further includes at least a second air gap in a flux path between a transformer core element and a choke core element.

BACKGROUND ART

Switched mode power supplies as main parts of telecom and commercial systems often dictate their size and electrical performance as well as reliability and costs. As requirements for the key characteristics power density and efficiency of power converters increase, the demands of these evaluation characteristics increase for inductive components particularly. One approach of increasing the power density and the efficiency is to integrate inductive components. Transformers and inductors can be integrated into a single magnetic structure which than reduces cost, increases power density and power efficiency.

A power converter where integrated magnetics are strongly recommended is the LLC resonant converter, which is capable of yielding high efficiency and high-quality EMI while operating at high switching frequency. U.S. Pat. No. 6,344,979 B1 discloses an insulating type DC-DC converter capable of insulating a voltage of a direct current power source and outputting a direct current to a load as shown in FIG. 1. It comprises LLC converter according to the prior art which uses three magnetic components: a series resonant inductor, a parallel resonant inductor, a two-winding or three-winding transformer. This converter results, additionally to the number of discrete magnetic components which yield higher size and costs, in at least three windings and several interconnections which negatively impact the efficiency.

A further type of power converter where integrated magnetic circuits are strongly recommended is the soft-switching converter.

In recent years some efforts were done to integrate all three magnetic components into a single component for LLC resonant converter. US 2008 0224 809 discloses an integrated magnetic structure (FIG. 2) that helps to increase power density as well as efficiency. Core losses are reduced by means of flux compensation in mutual core flanges and copper losses are minimized by reduction of interconnections between resonance choke and transformer. Mutual core flanges imply increase of power density.

Despite all the benefits of the LLC converter in terms of efficiency and EMI there are still some drawbacks. In a lot of application there is a need for over-current protection. US 2011 0255 321 discloses a LLC resonant converter capable of overcurrent protection. However, this circuit implies even more discrete magnetic components and more interconnections which increase the volume drastically and damage the efficiency gains. Also the above mentioned structure disclosed in US 2008 0224 809 is not suitable for such complex converters with more than one filter chokes and especially not for converter with split resonant chokes. Distributing the inductive components over more than one magnetic component would not only minimize losses and increase the volume, but may also deteriorate the EMI quality.

SUMMARY OF THE INVENTION

It is the object of the invention to create an integrated magnetic component for switching power supplies pertaining to the technical field initially mentioned allowing to integrate more inductive components, having an improved power density and therefore having reduced losses, without negatively impacting the EMI quality.

The solution of the invention is specified by the features of claim 1. According to the invention the integrated magnetic component includes a first choke winding arranged on a leg of a choke core element and a second choke winding arranged on another leg of a choke core element. One of the primary and the secondary winding is connected between the choke windings. This means that either the primary winding is connected in series between the choke windings or the secondary winding is connected in series between the choke windings. If one of the primary or secondary winding is connected between the choke windings also the other one of the primary or secondary winding may be connected in series between additional choke windings. The windings of the integrated magnetic component are interconnected to reduce core losses by flux compensation in order to increase power density.

The integrated magnetic component is directed, in general, to switched mode power converters and specifically to DC/DC and AC/DC power converters.

The above mentioned windings are connected in a way that fluxes through the cores will be minimized respectively that the fluxes through different parts of the cores which are caused by the different windings will be compensating each other at least to some extent. By reducing the flux respectively the flux density through the core elements, the losses are reduced. In particular the winding direction and the winding numbers will be adapted, that the fluxes through the flanges caused by the different windings will be minimized. Also the windings will be connected such that the fluxes in parallel legs will be distributed such that the flux density in the legs is similar in parallel legs.

The integrated magnetic circuit may also include further windings, which also have to be connected such that the core losses are minimized.

Preferably the core elements of the integrated magnetic component may be used as building blocks, in particular standardized building blocks may be used as building blocks. If the number of legs of a building blocks is two, standardized U-cores, UR-cores or similar cores may be used. If the number of legs of a core element is three, preferably standardizes E cores or similar cores having three legs are used. A non-exhaustive list includes three-leg cores such as E-, ER- and PQ-cores.

The core elements might be understood as abstract building blocks, though preferably they represent constructive building blocks made out of one single element or being assembled by different sub-building blocks, like I-core elements. For instance a constructive core element such as a U-shaped core element may be arranged by three I-core elements or an E-core element by four I-core elements or a U-core and an I-core element. By considering a core element as an abstract building block it is understood as a block which allows to achieve the final arrangement of the core of the magnetic circuit, though the same structure also might be achieved by other constructive elements. For example the O-like shape formed by the two transformer core elements may also be arranged by an I-core element defining the flange of a first transformer core element and a U-core element abutting the I-core element, providing the legs of said first transformer core element and the legs of a second transformer element as well as the flange of the second transformer element. Also an 8-like shape formed by two transformer core elements may be arranged by an I-core element defining a flange of a first transformer core element and an E-core element abutting the I-core element, providing the legs of said first transformer core element and the legs of a second transformer core element as well as the flange of the second transformer core element.

Two leg-cores are especially advantageous when the windings have to be adapted to high currents, which involves the use of spacious windings. This is especially the case if the integrated magnetic component is provided for power converters which are adapted to be connected to a low voltage input source such as a battery or a DC power supply (e.g. 12, 24, or 48 V). Contrary to that, integrated magnetic components with three leg element cores might be more advantageous if the power supplies are provided for connection to higher voltages, such as to domestic power networks, e.g. to a 400V domestic network.

The core elements are abutting or adjoining each other in the sense that specific parts of the surface of the core elements are touching each other. However, as will be described later, air gaps or any other material may be arranged between the core elements, in order to adjust the magnetic properties of the magnetic component.

A flux path between two cores is understood as path of low magnetic reluctance provided by the legs between the flanges of two adjacent core elements. An air gap being in a flux path may be situated at any position in the flux path defined by the legs of two adjacent cores: between two facing legs, in between a leg of a core or between a flange and a leg, wherein the flange and the leg may be of the same or of a different core element. In ferrite cores with high magnetic reluctance an air gap usually is a concentrated gap filled with air or any other material with low permeability, usually the gap being perpendicular to the leg. However, the air gap also may be distributed, what is achieved by using powder cores made out of a material comprising iron or an iron-alloy.

The first air gap in a flux path between the transformer core elements allows adjusting the magnetic characteristics of the transformer. In particular, it allows adjusting the parallel inductance of the primary or the secondary transformer winding. Likewise the second air gap allows adjusting the magnetic properties of the choke core elements. It allows adjusting a series resonant inductance of the choke winding.

Each choke core element abuts a flange of an adjacent transformer core element. The cores are preferably arranged such that the legs of the cores are linearly arranged in rows, in a way that the legs of one of the two transformer core elements abuts the legs of the other of the two transformer core elements and the legs of at least one of the choke cores abuts the flanges of the adjacent transformer core on the side of the flange opposite to the respective legs of said adjacent transformer core.

It is to be noted that the integrated magnetic circuit is preferably arranged in a plane.

It is also to be noted that legs and the flanges are preferably arranged in a rectangular angle, what simplifies the structure and the fabrication of the integrated magnetic component.

The integrated magnetic component according to the invention allows increasing the power density of complex magnetic circuits by reducing core losses while having a high EMI quality. The complex magnetic circuit may include at least four windings, namely a primary and a secondary winding of the transformer as well as a first and a second choke winding and thus provides the basis for the implementation of sophisticated switched mode power converters with at least four two series resonant inductors and a transformer with at least a primary and a secondary winding. It further provides a cost efficient implementation of the magnetic components of a switched mode power converter.

In a preferred embodiment of the invention the integrated magnetic component comprises at least two choke core elements. In this embodiment the second air gap is in the flux path between a transformer core element and a first of said choke core elements. The integrated magnetic component includes further at least a third air gap being in a flux path between the other of said transformer core elements and a second of said two choke core elements. Here the first choke winding is arranged on this first choke core element while the second choke winding is arranged on the second choke core element, in order to reduce air gap fringing fields by splitting the choke windings over the two choke cores.

By distributing the chokes over two choke core elements and simultaneously distributing the air gap over the two choke core elements, the fringing fields are reduced und thus the losses are reduced.

A further advantage of this embodiment is that integrated magnetic circuit will have an improved transient response.

In an advantageous embodiment the integrated magnetic component comprises exactly two choke core elements. This allows for a planar arrangement of the core elements while simultaneously distributing the air gap over two choke core elements.

In another advantageous embodiment of the invention each core element further comprises a centre leg which is arranged in between the outer legs of said core element, such that the outer legs, the centre leg and the flange of each core element form an E-like shape, and wherein the centre legs of the transformer core elements are facing each other, such that the two transformer core elements form an 8-like-shaped core element. The centre leg of each choke core element abuts the flange of the adjacent transformer core element, on the side opposite to the centre leg of said adjacent transformer core element.

Preferably the centre legs of the stacked core elements are arranged in rows. The centre legs are preferably abutting the flange of the adjacent core element in a rectangular angle.

In a preferred embodiment the transformer windings are wound around the centre legs of the transformer core elements, and the choke windings are wound around the centre legs of the choke core elements.

The advantage of this embodiment is that less windings and fewer connections are necessary and such lower costs are involved.

In a further advantageous embodiment of the invention the windings are arranged on the outer legs of respective U-cores elements. A winding may be divided in a first and a second winding part. At least one of the windings or at least one of the first winding parts is arranged on at least one of the first outer legs, while at least another one of the windings or one of the second winding parts is arranged on the second outer leg which is opposite to said at least one first outer leg. In addition, both of said windings or winding parts are connected in series, have the same number of turns and a winding direction such that a current through said serial connecting windings or winding parts causes magnetomotive forces which are acting in the same direction. The direction is defined in respect to a closed magnetic circuit, where the two opposite outer legs belong to.

Alternatively, the winding also might be wound only on the outer legs or also on the outer and the centre legs. If the core elements have three legs, respectively two outer legs and a centre leg, the transformer windings might also be wound on the centre cores and the choke windings around the outer legs or vice versa.

The windings also might be wound around the flanges of the cores.

In a preferred embodiment, the choke windings and the transformer winding which is connected between the first and the second choke winding is realised with a single wire to avoid additional lead-outs between the windings.

A continuous connection, established by the single wire respectively by a single connector, between the choke windings and the primary winding or the secondary winding of the transistor reduces the total number of soldered terminations and therefore reduces copper losses. In addition it simplifies the production process and therefore the costs of the integrated magnetic component.

In some embodiments it might be advantageous to first mount the transformer and/or the choke windings on the legs of the cores before assembling the core elements. In such a case it might be advantageous that the windings are only connected after the assembling of the core elements. The connection between the choke windings and one of the first or the second transformer might be realized by providing lead-outs of the respective windings and connecting them to a circuit board, for instance by soldering.

In an additional preferred embodiment of the integrated magnetic component, the primary winding and/or the secondary winding of the transformer are split into a first split transformer winding and a second split transformer winding. A first end of the first split transformer winding is connected to a first end of an electronic component, preferably a capacitive element. Further a first end of said second split transformer winding is connected to a second end of said electronic component, the second ends of said split transformer windings being connected to the first respectively the second choke winding.

This embodiment is particularly adapted for the integration of magnetic components of resonant switching converters, such as LLC converters. Thus it allows integrating a LLC converter with overcurrent protection with two series resonant inductors, two parallel inductors and a transformer, on a single integrated magnetic component with a high power density. The resonant serial capacitor of the LLC circuit can be connected between the primary parts of the split transformer windings, in parallel to a clamping circuit for overcurrent protection.

Also other electronic components might be connected between the transformer windings, as for instance a resistive element for damping purposes or a shunt resistor for measuring an input or an output current.

Alternatively to the electronic component, a centre tap may be connected to the first ends of the split transformer windings.

In a further embodiment the integrated magnetic component at least one of the air gaps is arranged in parallel to the flanges of the core elements of the integrated magnetic component.

The parallel arrangement not only simplifies dimensioning and the production but also the costs of the integrated magnetic component. However, in some cases it might be advantageous to arrange at least one air gap with an inclination angle different from zero in regard to the flanges of the core elements, especially, if the legs are not arranged in a rectangular angle in regard to the flanges of the core elements. Preferably, the surfaces of permeable material of the core elements, which define the air gaps, are plane. But they might have, because of other aspects, an uneven surface, for instance a concave surface, for the purpose of reducing fringing effects on the borders of the air gap.

Especially, if sintered or casted core elements are used, economical fabrication is not limited to air gaps which are parallel to the flanges of the core elements of the integrated magnetic component.

In a further preferred embodiment of the invention the air gaps are arranged in between the respective abutting core elements.

That means that the air gaps are arranged at connection points between the core elements. The advantage of this embodiment is, that the air gap can either be ground in the legs or be considered by using pre-fabricated core elements, where the length of the legs have been adjusted. The air gaps are preferably ground before assembling the respective core elements. The air gaps may be filled with any suitable material or left empty. By filling the air gaps with a non-permeably material the mechanical stability of the integrated magnetic circuit can be increased.

The air gaps can also be integrated in between a leg of a core or in between a flange and a leg of a core. Also more than one air gap can be integrated in a leg of a core. Thus the air gap fringing can be reduced.

In combination with concentrated air gaps or instead of concentrated air gaps distributed air gaps also may be applied by using powder materials for the core elements or parts of the core elements, in particular for the legs. Distributed air gaps respectively powder cores are preferably applied when energy has to be stored operating in high reluctance high saturation flux density area.

In an advantageous embodiment of the invention, the arrangement of the transformer core elements and the choke core elements is mirror symmetrical in respect to an axis parallel to the legs of the core elements.

A symmetrical arrangement of the core elements involves a symmetrical distribution of the magnetic flux in the circuit and therefore also lowers losses. In particular the compensation of fluxes through the flanges of transformer core elements which are abutting a choke core can be maximized. A symmetrical arrangement also lowers production costs and facilitates assembly.

However, in same cases it might be advantageous to choose a structure which is non-symmetrical in respect to the axis parallel to the legs of the core element. This might be the case, if the space available for the integrated magnetic circuit is not favourable for the integration of a symmetrical arrangement. In some cases also the magnetic components of the power converter to be implemented are not adapted for such a mirror symmetrical implementation. Also heat constraints might require a non-symmetrical arrangement, if for instance, one half of the circuit is exposed to a higher temperature.

In another advantageous embodiment of the integrated magnetic component according to the invention, the arrangement of the transformer core elements and the choke core elements is mirror symmetrical in respect to an axis parallel to the flanges of the core elements, in particular the air gaps being symmetrical to said axis.

This embodiment has, in particular, the advantage that both choke inductances are symmetrical what significantly increases the performance of the integrated magnetic component.

But also here, spatial constraints might require using an arrangement which is not compliant to symmetry in respect to an axis parallel in respect to the flanges of the core elements. This is, for instance, the case, if the number of choke core elements is impair. Also, the magnetic components of the power converter to be implemented might not be adapted for such a mirror symmetrical implementation, for instance, if different values for the serial inductors are required.

The invention further relates to a switched mode power converter including an integrated magnetic component according to any of the embodiments mentioned in the description.

In a preferred embodiment, the switched mode power converter is a LLC resonant converter.

In another preferred embodiment, the switched mode power converter is a soft switching converter.

The switched mode power converter inherits all of the advantages of the magnetic component mentioned above; this applies for an LLC resonant converter as well as for a soft switching converter.

The invention also relates to a method of providing an integrated magnetic component comprising the steps of
a) providing two transformer core elements, one or two choke core elements; each of the core elements being U-shaped comprising two outer legs and a flange,
b) forming a transformer by arranging the two transformer core elements to an O-like core element, arranging a primary winding and a secondary winding on legs of the transformer core elements and provide at least an air gap in a flux path between the transformer core elements,
c) arranging the choke core elements such that each of the choke core elements abuts a flange of one of the transformer core elements while providing at least a second air gap in a flux path between a transformer core and a choke core element, and by the step of
d) providing a series connection between the first choke winding, the primary or the secondary winding of the transformer and the second choke winding, such that said transformer is connected with one end to the first choke winding and with the other end to the second choke winding, arranging the first choke winding on a leg of a choke core element and arrange the second core winding on another leg of a choke core element, where all windings are being interconnected to reduce core losses by flux compensation in order to increase power density.

Other advantageous embodiments and combinations of features come out from the detailed description below and the totality of the claims.

BRIEF DESCRIPTION OF THE DRAWINGS

FIG. 17a), FIG. 17b) and FIG. 17c) show alternative built up of stacked U cores or similar two-leg cores for integrated magnetic components in FIG. 15 and FIG. 16.

In the figures, the same components are given the same reference symbols.

Preferred Embodiments

The LLC resonant converter circuit 10 comprises one resonant capacitor Cr, one series resonant inductor $L_r$, one parallel resonant inductor $L_m$ and, depending on the chosen rectifier at the output of the LLC converter, a two- or three-winding transformer 4. In the example according to FIG. 1 the transformer 4 comprises a primary winding P, a first secondary windings S1 and a second secondary winding S2. This converter results, additionally to the number of discrete magnetic components which yield higher size and costs, in at least three windings and several interconnections which negatively impact the efficiency.

Figure 1:
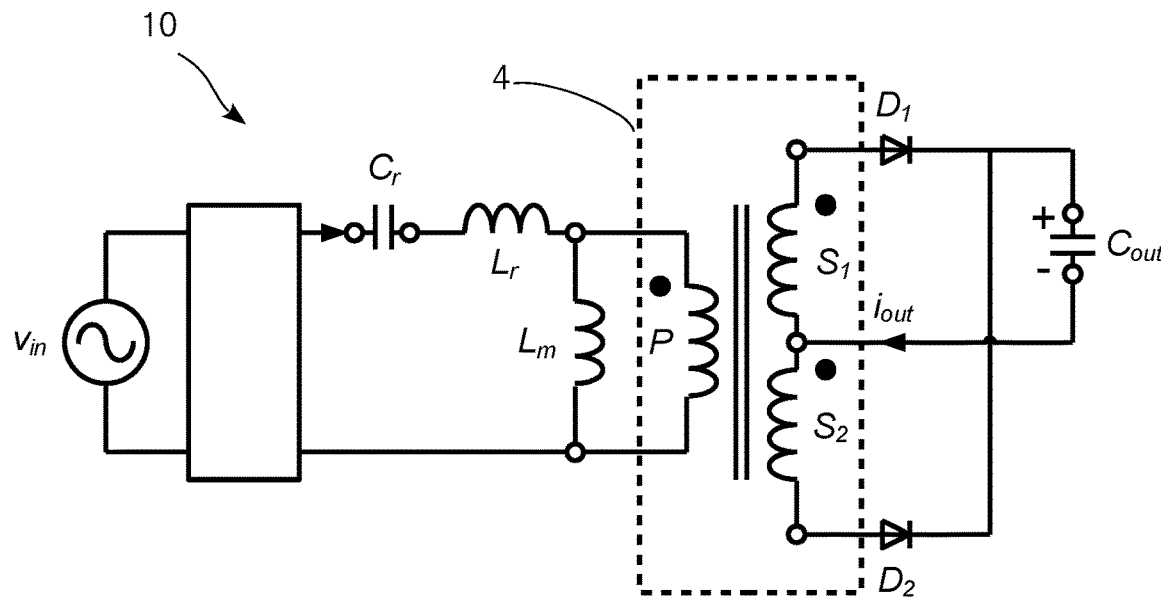
FIG. 1 is the schematic diagram of a prior art LLC resonant converter as shown in U.S. Pat. No. 6,344,979 B1.
Figure 2:
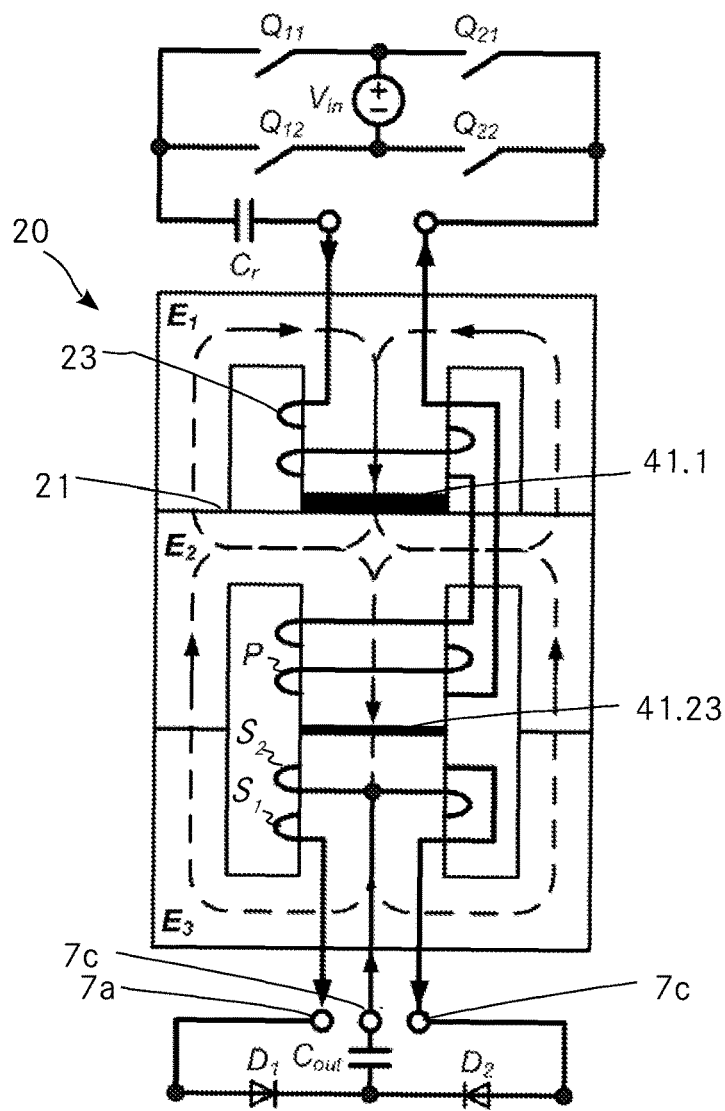
FIG. 2 is the integrated magnetic structure as shown in Patent US20080224809.

The integrated magnetic component 20 in FIG. 2 helps to increase power density of the LLC series parallel converter of FIG. 1 by integrating the three magnetic components of the circuit according to FIG. 1, namely the series resonant inductor Lr, the parallel resonant inductor Lm, and the transformer 4, in one integrated magnetic component 20. Core losses are reduced by means of flux compensation in mutual core flanges 21 and copper losses are minimized by reduction of interconnections between the windings of the integrated magnetic component 20. Mutual core flanges 21 imply also increase of power density.

The integrated magnetic component according to FIG. 2 is built by using 3 E-core elements: a choke core element E1, a first transformer core element E2 and second transformer core element E3. The two transformer core elements E2 and E3 are facing each other with their legs and form an 8-like shape transformer core. A transformer air gap 41.23 is positioned between the two center legs of the transformer core elements E2 and E3. The third choke-core E1 is stacked on the flange of the first transformer core element E2, such that it's outer legs are abutting the flange of the first transformer core element E2 on the side opposite to the outer legs of the first transformer core element E2. The center leg of the choke core element E3 is facing the center of the flange of the transformer core element E2 on the side opposite to center. A choke air gap 41.1 is situated between the flange of the first transformer core element E2 and the center leg of the choke core element E1. FIG. 2 shows a primary winding of the transformer P which is wound around the center leg of the first transformer core element E2, whereas the first and the second secondary windings S1 and S2 of the transformer are wound around the center leg of the second transformer core element E3. The primary winding of the transformer P and the first and the second secondary winding S1, S2 however also may be wound around the center legs of both transformer core elements, namely around the center leg of the first transformer core element E2 and the center leg of the second transformer core element E3, whereby the primary winding of the transformer P and the first and second secondary windings S1, S2 of the transformer S are arranged in layers.

The series resonant inductor Lr of the circuit is defined by a choke winding 23 wound around a centre leg of the choke core E1 element and the choke air gap 41.1 between the centre leg and the flange for the transformer core. Said choke winding is connected in series with the primary winding P of the transformer.

Upstream of the integrated magnetic component 20, the LLC converter according to FIG. 2 further comprises an H-bridge converter with four switches Q11, Q12, Q21, Q22 and a resonant capacitor Cr. At the output of the integrated magnetic component 20, a full wave centre tap rectifier with diodes D1, D2 and the filter capacitor Cout is connected to the secondary part of the transformer 4 in the load connection points 7a, 7b, 7c. It has to be mentioned that also a half-bridge with two switches could be used upstream of the integrated magnetic component 20 instead of the H-bridge converter with four switches.

Figure 3:
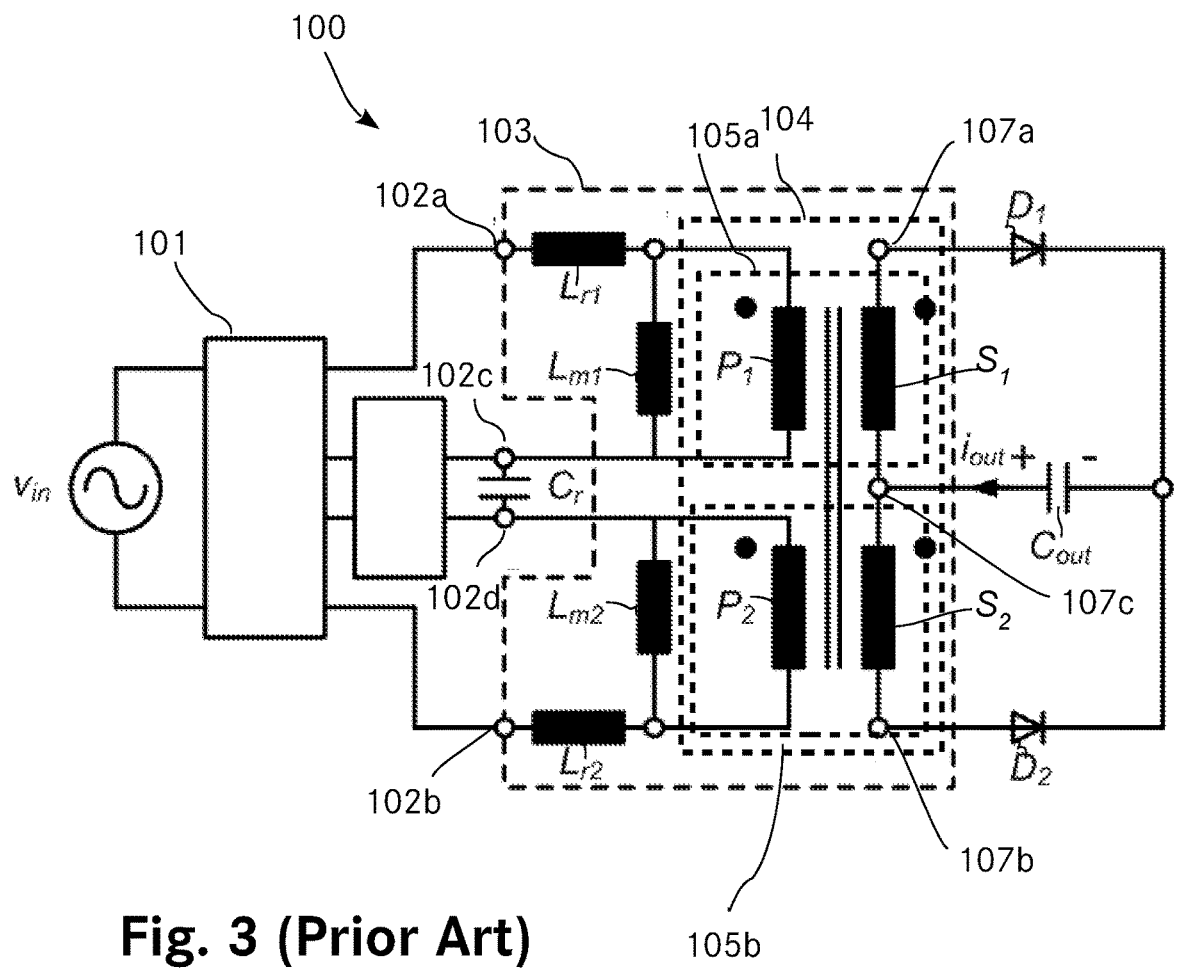
FIG. 3 is the circuit configuration of the LLC resonant converter with over current protection using split resonant chokes (LLC converter in Patent US20110255321A1)

However, the magnetic component according to FIG. 2 does not allow integrating the magnetic components of the electrical circuit configuration shown in FIG. 3, a LLC resonant converter with over current protection (OCP) using split resonant chokes.

However, this circuit can be integrated by means of a first embodiment of the integrated magnetic component 103 according to the invention.

In the following drawings similar elements of different embodiments are denoted by similar reference numerals differing by the hundreds digit if they are depicted in different drawings.

FIG. 3 shows an AC to DC converter 100 including a LLC converter unit 101 with a rectifying stage (not shown), and a full bridge (not shown) and a split resonant choke. The resonant LLC circuit with split resonant choke comprises a series resonant capacitor Cr, two series resonant inductors Lr1 and Lr2, two parallel resonant inductors Lm1 and Lm2 as well as a split transformer 104. All the five inductive components Lr1, Lr2, Lm1, Lm2, 104 are implemented on an integrated magnetic component 103 according to the invention. The split transformer 104 comprises a first transformer 105a with a first primary winding P1 and a first secondary winding S1, and a second transformer 105b with a second primary winding P2 and a second secondary winding S2.

The outputs of the LLC converter unit 101 are connected to a first connection point 102a and a second connection point 102b of the integrated magnetic component 103 according to the invention. In a third connection point 102c of the integrated magnetic circuit 103 the first primary winding P1 is connected with a first end to a first terminal of a series resonant capacitor Cr. Similarly, in a forth connection point 102d of the integrated magnetic circuit 103 the second primary winding P2 is connected with a first end to second terminal of the series resonant capacitor Cr. With their second ends the primary windings P1 and P2 are connected to a respective first end of the series resonant inductors Lr1, Lr2. The series resonant inductors Lr1, Lr2 themselves are connected to the converter outputs first and the second connection point 102a, 102b of the integrated magnetic component 103. The parallel inductors Lm1, Lm2 are arranged in parallel to the first und the second primary winding P1, P2 of the first and the second transformer 105a, 105b. A diode clamping circuit according to US 20110255321A1 is connected in parallel to the series resonant capacitor Cr, respectively between the third and the forth connection point 102c, 102d of the integrated magnetic component 103. The secondary site of the split transformer 104 of the integrated magnetic component 103 circuit comprises three connection points for connecting a full wave rectifier with a centre tap. Anodes of diodes D1, D2 of the full wave rectifier with a centre tapped connection are connected to a first and a second load connection point 107a and 107b. A filter capacitor Cout is connected with one end to the cathodes of respective diodes D1, D2, with another end to a centre tap of the split transformer 104 in a third load connection point 107c. Also a full wave bridge rectifier can be utilized instead. In latter case a single secondary winding can be used between the first and the second load connection point 107a and 107b, be using a single multiple winding transformer.

Figure 4:
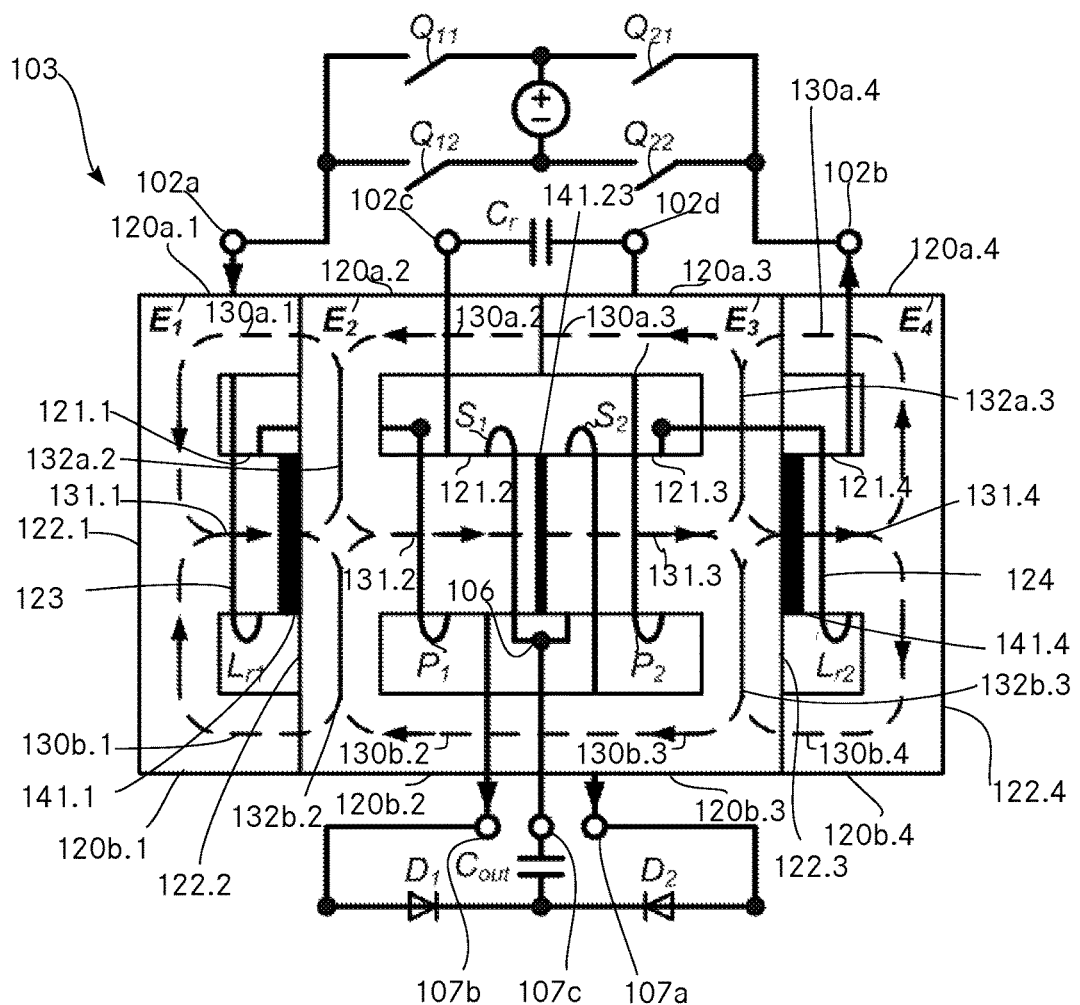
FIG. 4 shows a schematic diagram of a first preferred embodiment of the integrated magnetic component for LLC resonant converter with over current protection using split resonant chokes.

A schematic drawing of the first embodiment of the integrated magnetic component 103 according to the invention is shown in FIG. 4. It allows for the integration of all magnetic components of the LLC converter using a split resonant choke shown in FIG. 3 into one integrated magnetic component. The integrated magnetic component 103 comprises four E-core elements: A first transformer core element E2, a second transformer core element E3, a first choke core element E1 and a second choke core element E4. Each of said core elements E1, E2, E3, and E4 comprises a first outer leg 120a, a second outer leg 120b, a centre leg 121 and a flange 122.

The two transformer core elements E2 and E3 are facing each other with their first outer legs 120a.2, 120a.3, their second outer legs 120b.2, 120b.3 and their center legs 121.2, 121.3 and form an 8-like shaped transformer core. A transformer air gap 141.23 is arranged between the two center legs 121.2, 121.3 of the first transformer core element E2 and the second transformer core element E3. The first choke-core element E1 is stacked on the flange 122.2 of the first transformer core element E2, such that its first outer leg 120a.1 and its second outer leg 120b.1 are abutting the flange 122.2 of the first transformer core element E2 on the side opposite to the outer legs 120a.2, 120b.2 of the first transformer core element E2. The center leg 121.1 of the choke core element E1 is facing the center of the flange 122.2 of the first transformer core element E2 on the side opposite to center leg 121.2 of the first transformer core element E2. A first choke air gap 141.1 is placed between the flange 122.2 of the first transformer core element E2 and the center leg 121.1 of the choke core element E1.

The second choke core element E4 is stacked on the flange 122.3 of the second transformer core element E3, such that it's first outer leg 120a.4 and its second outer leg 120b.4 are abutting the flange 122.3 of the second transformer core element E3 on the side opposite to the outer legs 120a.3, 120b.3 of the second transformer core element E3. The center leg 121.4 of the second choke core element E4 is facing the center of the flange 122.3 of the second transformer core element E3 on the side opposite to center leg 121.3 of the second transformer core element E3. A second choke air gap 141.4 is placed between the flange 122.3 of the second transformer core element E3 and the center leg 121.4 of the second choke core element E4.

The air gaps 141.1, 141.4, 141.23 can be achieved by grinding the respective center leg 121.1, 121.2, 121.3 or 121.4. They may be filled with air or any other material with low permeability.

For a clearer representation in FIG. 4 the first primary winding P1 of the transformer 104 (see FIG. 3) is wound around the center leg 121.2 of the first transformer core element E2, the second primary winding P2 of the transformer 104 (see FIG. 3) is wound around the center leg 121.3 of the second transformer core element E3. The first secondary winding S1 is wound around the center leg 121.2 of the first transformer core element E2 and the second secondary winding S2 of the transformer 104 is wound around the center leg 121.3 of the second transformer core element E3.

Preferably however the first primary winding P1, the second primary winding P2, the first secondary winding S1 and the second secondary winding S2 of the transformer 104 are all wound around the center legs of both transformer core elements E2 and E3, namely around the center leg 121.2 of the first transformer core element E2 and the center leg 121.3 of the second transformer core element E3, whereby the primary windings P1, P2 of and the secondary windings S1, S2 of the transformer 104 are stacked in layers, the primary windings of the transformer P1, P2 being for instance enclosed by the secondary windings S1, S2 of the transformer 104 or vice versa.

The secondary windings S1, S2 are connected in series, the first and the second secondary windings S1, S2 of the transformer having the same winding direction.

The connection is preferably made by using the same wire for both windings thus, avoiding copper losses due to a soldered interconnection between both secondary windings S1, S2. The second end of the first secondary winding S1 is connected with a free end to the first load connection point 107a, a second end of the second secondary winding S2 is connected with a free end to a second load connection point 107b. A center tap 106 is arranged on the wire between the secondary windings S1, S2 and connected to the third load connection 107c of the integrated magnetic component 103.

The transformer air gap 141.23 allows defining the parallel inductors Lm1, Lm2 of the resonant LLC circuit. A first choke winding 123 is wound around the center leg 121.1 of the first choke core element E1; whereas a second choke winding 124 is wound around the center leg 121.4 of the second choke core element E4. The first choke winding 123 is connected between the first connection point 102.a and the first end of the primary winding P1 of the transformer 104 (see FIG. 3). Similarly, the second choke winding 124 is connected between the second connection point 102.b and the first end of the second primary winding P2 of the transformer 104 (see FIG. 3). The connection between the choke windings 123, 124 and the primary windings P1, P2 of the transformer winding are achieved by using a sole wire.

All windings of the magnetic component connected to the primary part of the transformer, respectively the choke windings 123, 124 and the primary windings P1, P2 are wound around center legs 121.1, 121.2, 121.3, 121.4 of the respective core elements, the center legs being arranged in a row. Moreover, all windings have the same winding direction thus, a current through the above mentioned windings connected in series yields to a central magnetic flux 131.1, 131.2, 131.3, 131.4 through the center legs of the four core elements E1, E2, E3 and E4 which is directed in the same direction. Consequently, a first outer flux 130a.1, 130a.2, 130a.3, 130a.4 through the first outer legs 120a.1, 120a.2, 120a.3, 120a.4 of the respective core elements and a second outer flux 130b.1, 130b.2, 130b.3, 130b.4 through the second outer legs 120b.1, 120b.2, 120b.3, 120b.4 of the respective core elements are orientated in the direction opposite to the central magnetic flux 131.1, 131.2, 131.3, 131.4. As the outer magnetic fluxes 130a.1, 130a.2, 130a.3, 130a.4, 130b.1, 130b.2, 130b.3, 130b.4 through the first and the second outer legs are opposed to the central magnetic fluxes 131.1, 131.2, 131.3, 131.4, the flange magnetic fluxes 132a.2 and 132b.2 through the flanges of the first transformer core elements E2 and also flange magnetic fluxes 132.2 and 132.3 through the flanges of the second transformer core element E3 are reduced by flux cancellation and thus results increase power density and reduce copper and core losses.

The second end of the first primary winding P1 of the transformer 104 and the second end of the second primary winding P2 of the transformer 103 (see FIG. 3) are connected to the third connection point 102c respectively the forth connection point 102d of the integrated magnetic component 103. The series resonant capacitor Cr is connected with its both ends to the third and the forth connection point 102c, 102d of the integrated magnetic circuit 103.

The first series resonant inductance Lr1 of the circuit is defined by the choke winding 123 wound around the centre leg 121.1 of the first choke core E1 element and the first choke air gap 141.1 between the centre leg 121.1 and the flange 122.2 of the transformer core. Said choke winding 123 is connected in series with the first primary winding P1 of the transformer 104 (see FIG. 3).

Similarly, the second series resonant inductance Lr2 of the circuit is defined by the choke winding 124 wound around the centre leg 121.4 of the second choke core E4 element and the second choke air gap 141.4 between the centre leg 121.4 of the second choke winding E4 and the flange 122.3 of the second transformer core element E3. Said second choke winding 124 is connected in series with the second primary winding P2 of the transformer 104 (see FIG. 3).

Upstream of the integrated magnetic component 103, the LLC converter comprises a full-bridge converter with a switch network of four switches Q11, Q12, Q21 and Q22. The switch network provides a square voltage output between the first and second connection point 102a, 102b of the integrated magnetic component from a DC input voltage Vdc. The DC input voltage Vdc may be provided by a rectifying circuit, such as an AC/DC power factor correction (PFC) converter. Instead of a full-bridge converter with a switch network of four switches a half-bridge rectifier with two switches can also be used.

Downstream to the integrated magnetic component 103, at the output of the integrated magnetic component 103, a centre tap full wave rectifier is provided and connected to the load connection points 107a, 107b, 107c.

Figure 5:
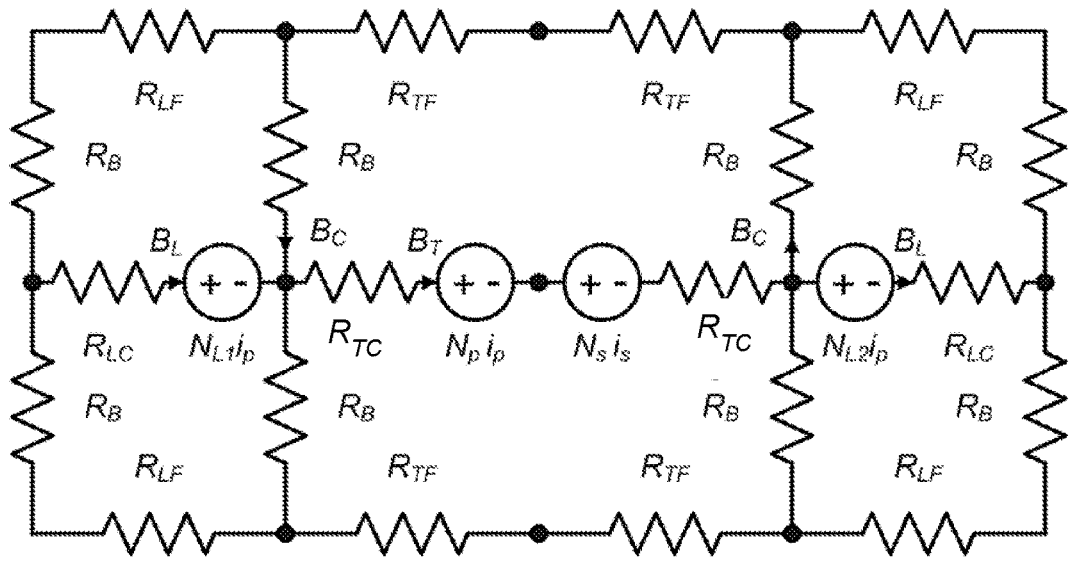
FIG. 5 represents a reluctance model of the integrated magnetic component presented in FIG. 4.

FIG. 5 shows a reluctance model 150 of the integrated magnetic component 103 according to the first embodiment of the invention (FIG. 4). The flanges 122.1, 122.2, 122.3, 122.4 of all core elements E1, E2, E3 and E4 are considered to be identical and represented by a flange reluctance $R_B$. Also the legs 120a.1, 120a.4, 120b.1, 120b.4 of the choke inductor cores E1 and E4 are considered to be identical. $R_{LF}$ designates the reluctance of the outer legs 120a.1, 120a.4, 120b.1, 120b.4 of the choke core elements E1, E4 and $R_{LC}$ the reluctance of the respective centre leg 121.1, 121.4 of the respective choke core elements E1 and E4. The reluctance of the centre legs 121.1, 121.4 includes the respective air gap (141.1, 141.4) defined by the centre leg 121.1, 121.4.

Also the transformer core elements E2 and E3 are considered to be identical. $R_{TF}$ is the reluctance of each of its outer legs 120a.2, 120a.3, 120b.2, 120b.3 of the transformer core elements E2, E3 and $R_{TC}$ is the reluctance of each of its centre legs 121.2, 121.3, including its portion on the air gap 141.23 in the flux path between the first and the second transformer core element E2, E3. The current $i_p$ through the first and second choke windings 123, 124 and the transformer primary windings P1, P2 is considered to be the same. Also the current $i_s$ through the secondary windings S1, S2 is considered to be identical. Windings turn numbers are: for the first choke winding $N_{L1}$, for the second choke winding $N_{L2}$, $N_P$ for the primary transformer winding and $N_S$ for the transformer secondary winding. $N_{L1}$ and $N_{L2}$ are considered equal: $N_{L1}=N_{L2}=N_L$.

The reluctance model shown 150 in FIG. 5 will be analysed hereafter with just the first secondary S1 winding considered. After mathematical description of the reluctance model 140 and application of Faraday's Law on all windings, some equations manipulation yield the inductance matrix of the integrated component which is calculated to be $$L = \begin{pmatrix} L_{11} & M_{12} \\ M_{12} & L_{22} \end{pmatrix}$$

$$= \begin{pmatrix} \left(2 \cdot \frac{R_B // R_L // R_T}{R_L \cdot R_T} N_L + \frac{N_P}{R_T + R_B // R_L}\right) \cdot N_P + \frac{N_L^2}{R_L + R_B // R_T} & \left(\frac{R_B // R_L // R_T}{R_L \cdot R_T} N_L + \frac{N_P}{R_T + R_B // R_L}\right) \cdot N_s \\ \left(\frac{R_B // R_L // R_T}{R_L \cdot R_T} N_L + \frac{N_P}{R_T + R_B // R_L}\right) \cdot N_s & \frac{N_s^2}{R_L + R_B // R_T} \end{pmatrix}$$

with $N_{L1} = N_{L2} = N_L/2$, $R_L = 2 \cdot R_{LC} + R_{LF} + R_B$ and $R_T = 2 \cdot R_{TC} + R_{TF}$.

Using calculated elements of the inductance matrix, primary $L_{11}$, secondary self-inductances $L_{22}$ and the mutual inductance $M_{12}$, parameters of transformer π model, the primary leakage inductance $L_r$, the magnetizing inductance $L_m$ and the equivalent primary turn number $N_{pn}$ are respectively described as $$L_r = L_{11} - \frac{M_{12}^2}{L_{22}} = \frac{N_L^2}{R_B + R_L}$$

$$L_m = L_{11} - L_r = \frac{N_{pn}^2}{R_T + R_B // R_L} \text{ and}$$

$$N_{pn} = N_s \frac{L_m}{M_{12}} = N_p + \frac{R_B}{R_B + R_L} N_L$$

$N_p$ turns are wound but the transformer 104 exhibits $N_{pn}$ turns. By introducing the air gap 141.23 in the centre leg 121.2, 121.3, the effective primary number of turns $N_{pn}$ becomes higher than the factual number of turns $N_p$ which allows reducing primary copper losses.

For high permeability low saturation flux density material with no air gap in flanges and outer legs, just $R_{TC} \gg R_{TF}$, $R_B$ and $R_{LC} \gg R_{LF}$, $R_B$, the gapped transformer and resonant inductor are decoupled and the primary leakage inductance $L_r$, the magnetizing inductance $L_m$ and the equivalent primary turn number $N_{pn}$ are simplified to be:

$$L_r \approx \frac{N_L^2}{2 \cdot R_{LC}}, L_m \approx \frac{N_{pn}^2}{2 \cdot R_{TC}}, N_{pn} \approx N_p,$$

$$L_{r1} = L_{r2} \approx \frac{N_L^2}{4 \cdot R_{LC}} \text{ and } L_r = L_{r1} + L_{r2}.$$

Figure 6:
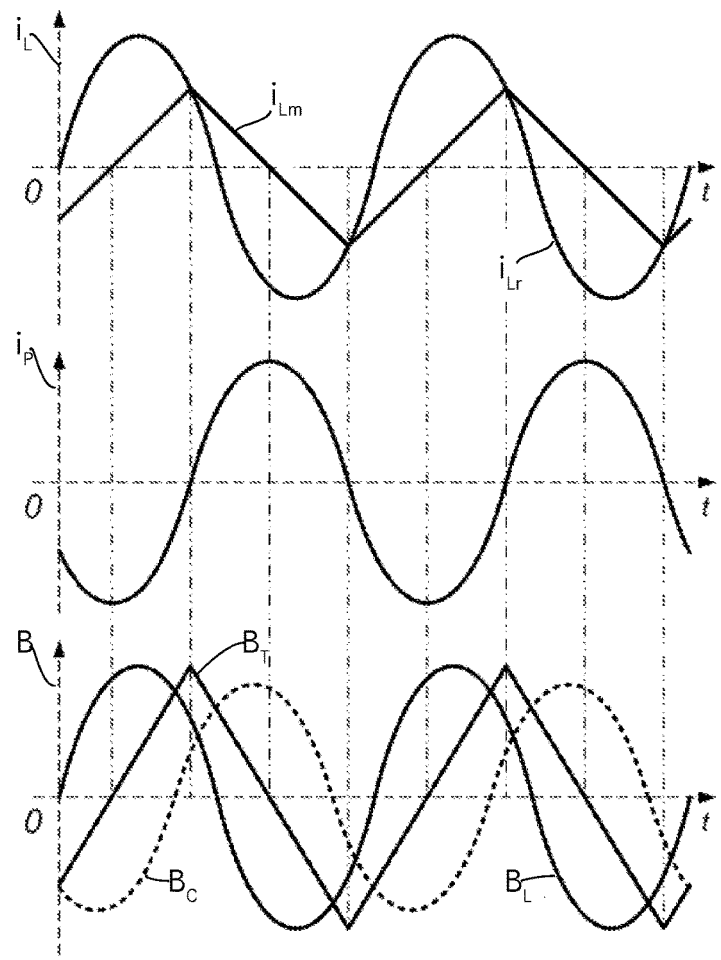
FIG. 6 shows the series resonant choke current, the parallel resonant choke current and primary winding current as well as flux density in cores of transformer, choke and in mutual flanges.

FIG. 6 illustrates the curve of current $i_{Lr}$ through the first and second series resonant inductor ($L_{r1}$ and $L_{r2}$) and of current $i_p$ through the primary winding (P1 and P2). Those currents are sinusoidal while the curve of a current $i_{Lm}$ through the parallel resonant inductor ($L_{m1}$ and $L_{m2}$) is triangular. The flux density $B_L$ (induction) in inductor core centre leg ($R_{LC}$, FIG. 5) is sinusoidal and proportional to series resonant inductor current $i_{Lr}$. The flux density $B_T$ (induction) in transformer core centre leg ($R_{TC}$, FIG. 5) is triangular and proportional to primary current $i_p$. The curve of flux density $B_c$ in flanges ($R_B$, FIG. 5) of transformer cores $E_2$ and $E_3$ is out of difference between $B_L$ and $B_T$ and is sinusoidal as well.

Figure 7:
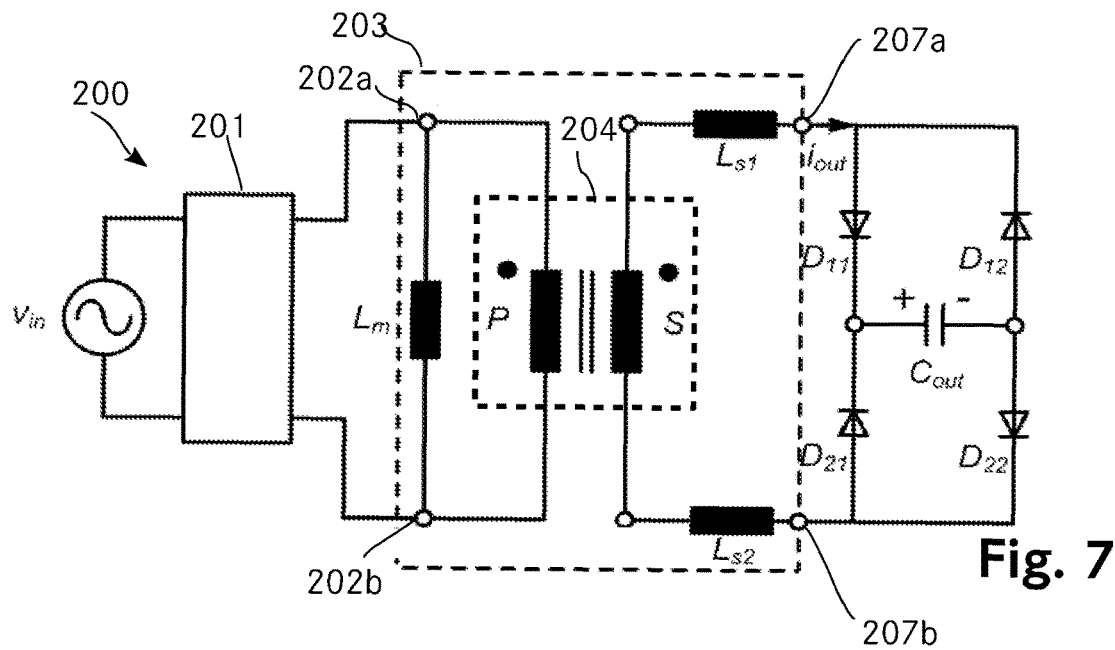
FIG. 7 depicts the schematic circuit of the soft switching converter with split secondary filter chokes.

FIG. 7 shows an electrical diagram of an AC to DC converter 200 including a soft switching converter unit 201 and a soft switching circuit with two series output inductors Ls1 and Ls2, a parallel inductors Lm and a transformer 204. All those magnetic components are implemented by means of an integrated magnetic component 203 according to a second embodiment of the invention. The electric circuit according to FIG. 7 comprises a soft switching converter unit 201 with two outputs (as for instance proposed in U.S. Pat. No. 6,862,195B). The outputs are connected to a first connection point 202a and a second connection point 202b of the integrated magnetic component 203 implementing the magnetic components of the soft switching circuit. The integrated magnetic component comprises a first load connection output 207a and a second load connection output 207b, for connecting an H-bridge full wave rectifier comprising four diodes D11, D12, D21, D22 and a filter capacitor Cout.

The integrated magnetic component 203 implements a transformer 204 comprising a primary winding P and a secondary winding S, a parallel inductor Lm and a first serial output inductor Ls1 and a second serial output inductor Ls2. The primary winding P of the transformer 204 is connected between the first connection point 202a and the second connection point 202b, in parallel to the parallel inductor Lm. The first serial output inductor Ls1 is connected between a first end of the secondary winding S of the transformer 204 and the first load connection point 207a, the second serial output inductor Ls2 between a second end of the secondary winding S of the transformer 204 and the second load connection point 207b. Instead of H-bridge rectifier with four diodes also centre tapped rectifier with two diodes may be used. In this case the integrated magnetic component must comprise a third load connection point being connected to a tap between a split secondary winding of the transformer 204.

Figure 8:
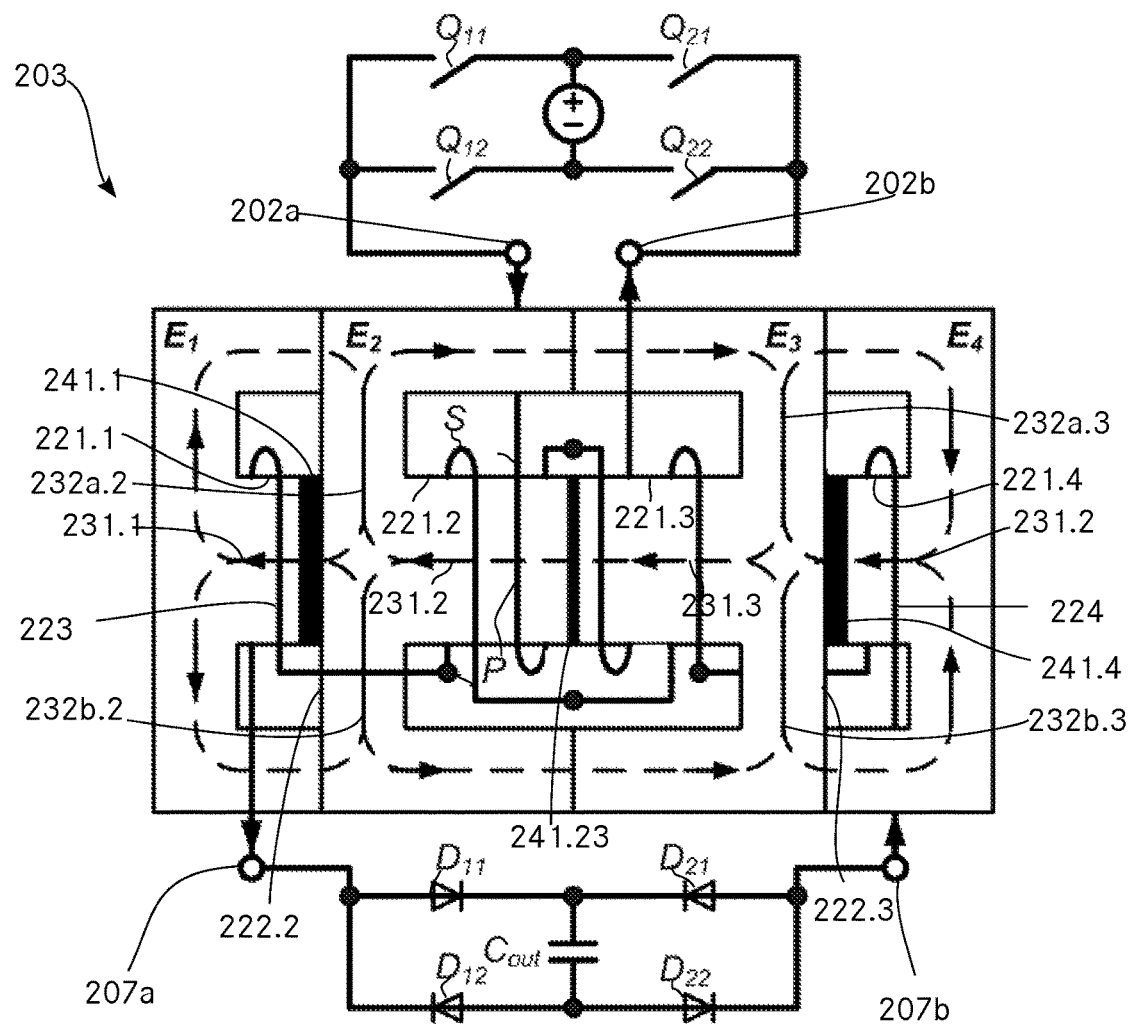
FIG. 8 shows a second embodiment of the integrated magnetic component, for integrating the magnetic components of the soft switching converter with split secondary filter chokes, as shown in FIG. 7.

The integrated magnetic component 203 according to the invention is depicted in more detail in FIG. 8, showing a schematic drawing of the integrated magnetic component 203 according to the invention. The integrated magnetic component 203 of FIG. 8 is similar to the integrated magnetic component 103 of FIG. 4. It also comprises a first transformer core element E2, a second transformer core element E3, a first choke core element E1 and a second choke core element E4. As the arrangement of the core elements in this embodiment is the same as the one of the first embodiment of the invention, the description of the arrangement of the four core elements E1, E2, E3, E4 according to FIG. 4 can be applied mutatis mutandis by increasing the hundred digits of the reference numerals by one.

In FIG. 8 a first half of the primary winding P of the transformer 204 (see FIG. 7) is wound around the center leg 221.2 of the first transformer core element E2 and a second half of the primary winding around the center leg 221.3 of the second transformer core element E3.

Similarly a first half of the secondary winding S is wound around the center leg 221.2 of the first transformer core element E2 and a second half of the winding S of the transformer 204 is wound around the center leg 221.3 of the second transformer core element E3. Both halves of the secondary winding are connected in series, having the same winding direction.

Preferably however the primary winding P of the transformer 204 and the secondary winding S of the transformer 204 are simultaneously wound around the center legs of both transformer core elements E2 and E3, namely around the center leg 221.2 of the first transformer core element E2 and the center leg 221.3 of the second transformer core element E3, whereby the primary winding P of the transformer 204 and the secondary winding S of the transformer 204 are arranged in layers, the primary winding P of the transformer 204 being for instance enclosed by the secondary windings S of the transformer 204 or vice versa.

The first choke output winding 223 is connected between a first end of the secondary winding S of the transformer 204 (see FIG. 7) and the first load connection point 207.a. Likewise, the second output choke winding 224 is connected between another end of the secondary winding S of the transformer 204 (see FIG. 7) and the second load connection point 207.b. The connection between the output choke windings 223, 224 and the secondary winding S of the transformer winding and also between the two halves of the secondary winding S may be achieved by using a sole wire. Thus, copper losses due to soldered interconnections are avoided.

The air gap 241.23 is ground into the center legs 221.2, 221.3 of the transformer core elements E2 and E3 to set a parallel input inductance Lm. A first output choke winding 223 is wound around the center leg 221.1 of the first choke core element E1, whereas a second output choke winding 224 is wound around the center leg 221.4 of the second choke core element E4. The first output filter inductance value Ls1 of the circuit according to FIG. 7 is set by the first choke air gap 241.1 between the centre leg 221.1 of the first choke core element E1 and the flange 222.2 of the first transformer core element E2. The air gap 241.1 also prevents core saturation. Likewise, the second output filter inductance Ls2 of the circuit according to FIG. 7 is set by the second choke air gap 241.4 between the centre leg 221.4 of the second choke core element E4 and the flange 222.3 of the second transformer core element E3. Also the second choke air gap 241.4 prevents core saturation. Thus, the output choke inductance is split over two core elements.

Similarly to the LLC resonant converter according to FIG. 4, a switch network of four switches Q11, Q12, Q21, Q22 provides a square voltage output to the first and second connection point 202a, 202b of the integrated magnetic component from a DC input voltage Vdc. The DC input voltage may be provided by a rectifying circuit, such as a AC/DC power factor correction (PFC) converter.

Downstream to the integrated magnetic component 203, at the output of the integrated magnetic component 203, a full wave rectifier is provided and connected to the load connection points 207a, 207b.

Analogously to the integrated magnetic component of the first embodiment of the invention (FIG. 4), all windings of the magnetic component connected to the secondary part of the transformer, respectively the choke windings 223, 224 and the secondary windings S1, S2 are wound around center legs 221.1, 221.2, 221.3, 221.4 of the respective core elements, the center legs 221.1, 221.2, 221.3, 221.4 being arranged in a row. Moreover, all windings have the same winding direction, thus a current through the above mentioned windings connected in series yields to central magnetic fluxes 231.1, 231.2, 231.3, 231.4 through the center legs 221.1, 221.2, 221.3, 221.4 of the four core elements E1, E2, E3, and E4 which are directed in the same direction. Accordingly, also the orientation of magnetic fluxes through the other parts of the core elements is similar to the magnetic fluxes of the first embodiment. In particular, the flange magnetic fluxes 232a.2 and 232b.2 through the flanges of the first transformer core elements E2 and also flange magnetic fluxes 232a.3 and 232b.3 through the flanges of the second transformer core element are reduced by flux cancellation and thus results in an increase of power density and in a reduction of copper and core losses.

Figure 9:
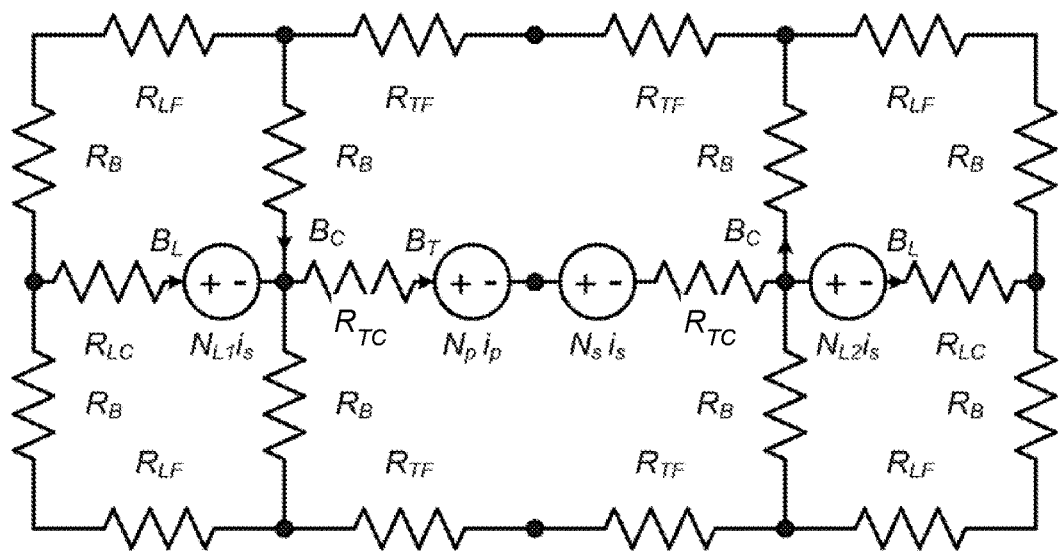
FIG. 9 shows the reluctance model of integrated magnetic structure presented in FIG. 8.

The corresponding reluctance model 250 of the proposed structure of the integrated magnetic component 203 according to the invention for the integration of the input parallel inductor Lm, the transformer 204 and both output filter inductors Ls1, Ls2 is shown in FIG. 9. The flanges of all cores elements E1, E2, E3 and E4 are considered to be identical and represented by reluctance $R_B$. Inductor cores elements E1 and E4 are considered to be identical. $R_{LF}$ is the reluctance of each outer leg and $R_{LC}$ is the reluctance of the centre leg including its respective air gap 241.1, 241.4. The transformer core elements E2 and E3 are considered to be identical. $R_{TF}$ is the reluctance of each outer leg and $R_{TC}$ is the reluctance of the centre leg including its air gap 241.23. The current through the primary winding S is the primary current $i_p$ and the current through the transformer secondary winding P and the output choke windings 223 and 224 is considered to be identical, being designated as secondary current $i_s$. Windings turn numbers are $N_P$, $N_S$, $N_{L1}$ and $N_{L2}$ for the transformer primary winding P and transformer secondary winding S, the first output choke winding, and the second output choke winding, respectively. $N_{L1}$ and $N_{L2}$ are considered to be equal.

The reluctance model shown in FIG. 9 will be analysed hereafter. After mathematical description of the reluctance model and application of Faraday's Law on all windings, some equations manipulation yield the inductance matrix of the integrated component which is calculated to be $$L = \begin{pmatrix} L_{11} & M_{12} \\ M_{12} & L_{22} \end{pmatrix}$$

$$= \begin{pmatrix} \dfrac{N_P^2}{R_T + R_B // R_L} & \left(\dfrac{R_B // R_L // R_T}{R_L \cdot R_T} \cdot N_L + \dfrac{N_s}{R_T + R_B // R_L}\right) \cdot N_P \\ \left(\dfrac{R_B // R_L // R_T}{R_L \cdot R_T} \cdot N_L + \dfrac{N_s}{R_T + R_B // R_L}\right) \cdot N_P & \left(2 \cdot \dfrac{R_B // R_L // R_T}{R_L \cdot R_T} \cdot N_L + \dfrac{N_s}{R_T + R_B // R_L}\right) \cdot N_s + \dfrac{N_L^2}{R_L + R_B // R_T} \end{pmatrix}$$

with $N_{L1} = N_{L2} = N_L/2$, $R_L = 2 \cdot R_{LC} + R_{LF} + R_B$ and $R_T = 2 \cdot R_{TC} + R_{TF}$.

Using calculated elements of the inductance matrix, primary $L_{11}$, secondary self-inductances $L_{22}$ and the mutual inductance $M_{12}$, parameters of transformer π model, the magnetizing inductance $L_m$ the secondary leakage inductance $L_r$, and the equivalent secondary turn number $N_{sn}$ are respectively described as $$L_m = L_{11} = \dfrac{N_P^2}{R_T + R_B // R_L},$$

$$L_r = L_{22} - \dfrac{M_{12}^2}{L_{11}} = \dfrac{N_L^2}{R_L + R_B},$$

$$N_{sn} = N_P \dfrac{M_{12}}{L_{11}} = N_s + \dfrac{R_B}{R_L + R_B} N_L.$$

$N_s$ turns are wound but the transformer exhibits $N_{sn}$ turns. By introducing an air gap 241.23 in flux path defined by the centre legs 221.2, 221.3 the effective secondary number of turns $N_{sn}$ becomes higher than the factual number of turns $N_s$ which allows reducing secondary copper losses.

For high permeability low saturation flux density material with no air gap in flanges and outer legs, just $R_{TC} \gg R_{TF}$, $R_{LC} \gg R_{LF}$, $R_B$, and the gapped transformer and output filter inductor are decoupled and the primary leakage inductance $L_r$, the magnetizing inductance $L_m$ and the equivalent primary turn number $N_{pn}$ are simplified to be:

$$L_r \approx \dfrac{N_L^2}{2 \cdot R_{LC}}, L_m \approx \dfrac{N_P^2}{2 \cdot R_{TC}}, N_{sn} \approx N_s,$$

$$L_{r1} = L_{r2} \approx \dfrac{N_L^2}{4 \cdot R_{LC}} \text{ and } L_r = L_{r1} + L_{r2}.$$

Figure 10:
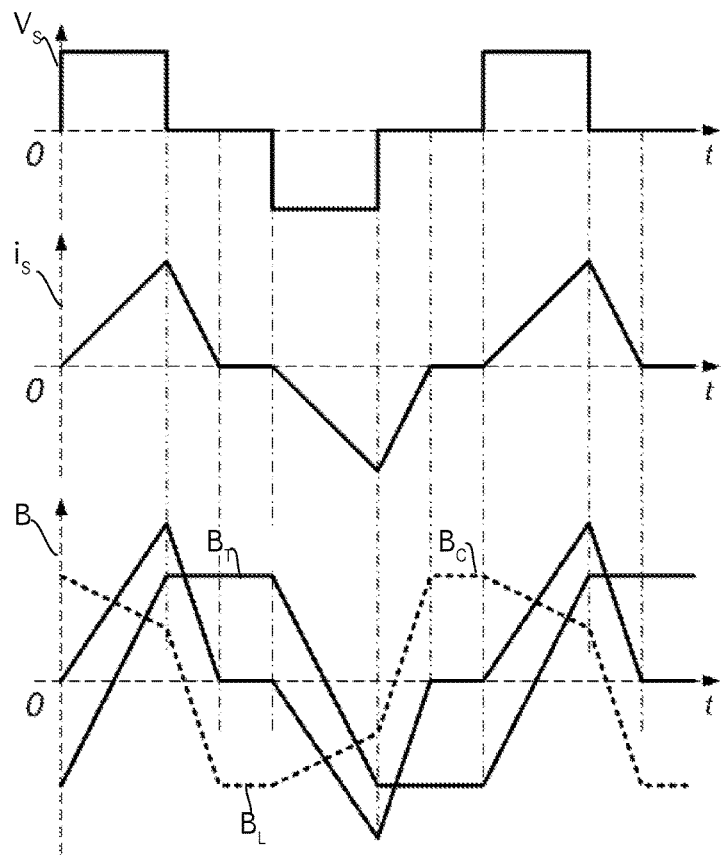
FIG. 10 shows voltage and current of secondary transformer winding as well as flux density in cores of transformer, choke and in mutual flanges.

FIG. 10 illustrates run of curve of output voltage Vs and current $I_S$ through the secondary transformer winding S as well as flux density in the centre legs (221.3, 221.3, FIG. 8; $B_T$ FIG. 9) of the transformer core elements E2, E3, the centre legs (221.1, 221.4, FIG. 8; $B_L$, FIG. 9) of the choke core elements E1, E4 and in the mutual flanges respectively the flanges of the transformer core elements (222,2, 222.3, FIG. 8, $B_C$, FIG. 9). As illustrated in FIG. 10, the curve of transformer secondary winding current $i_s$ is triangular and proportional to flux density $B_L$. The flux density $B_L$ (induction) in the choke core centre leg (221.1, 221.4, FIG. 8; $R_{LC}$, FIG. 9) is triangular and proportional to secondary current $i_s$. The flux density $B_T$ (induction) in transformer core element centre leg (221.2, 221.3, FIG. 8; $R_{TC}$, FIG. 9) is trapezoidal. The curve of flux density $B_C$ in flanges (222.2, 221.3, FIG. 8; $R_B$, FIG. 9) of transformer cores E2 and E3 is out of difference between $B_L$ and $B_T$. The flux densities in the flange of the transformer core elements (222.2, 222.3. FIG. 8) $B_C$ are reduced and therefore the core losses in there are minimized.

Figure 11:
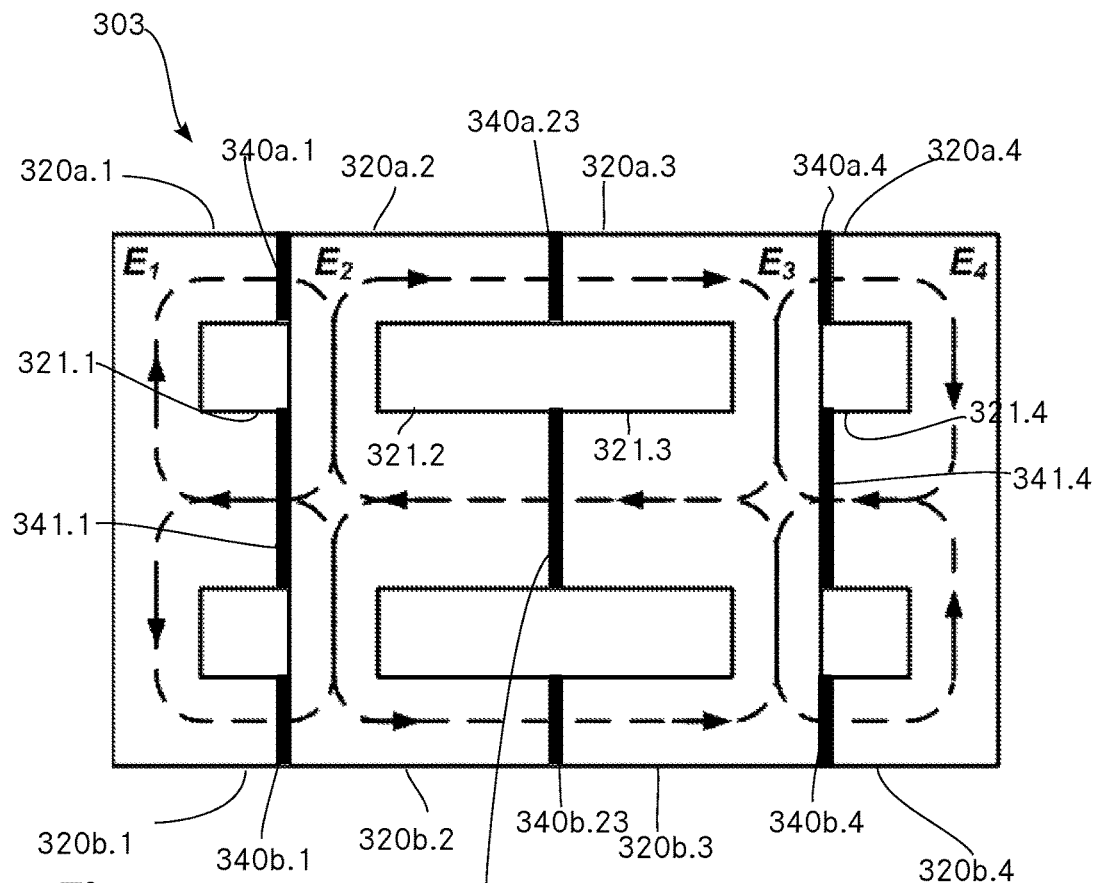
FIG. 11 is a schematic diagram of a third embodiments of the invention, built up of stacked EE cores or similar three-leg cores for integrated magnetic components in FIG. 4 and FIG. 8, differing by the arrangement of the air gaps in the longitudinal flux paths.

As depicted in FIG. 11, showing a third embodiment of the integrated magnetic component 303 according to the invention, the air gaps can also be distributed along all three legs of any core. Distribution of the air gaps over the legs of the core elements reduces negative effects of air gap fringing fields and may also avoid grinding of the core elements, for instance be inserting a flat layer of a material with a low permeability.

This in contrast to the first embodiment of the integrated magnetic component 103 (FIG. 4) and the second embodiment of the integrated magnetic component 203 (FIG. 8), where the air gaps 141.1, 141.23, 141.4, 241.1, 241.23, 241.4 are single air gaps arranged in the centre legs (121.1, 121.2, 121.3, 121.4, 221.1, 221.2, 221.3, 221.4) of the core elements E1, E2, E3 and E4 which yields higher fringing fields.

The air gap in a flux path between the first/second choke core element E1/E4 and the first/second transformer core element E2/E3 is distributed over the three legs: a centre air gap 341.1, 341.4, arranged between the centre leg 321.1/

321.4 of the first/second choke core element E1/E4 and the first/second transformer core element E2/E3, a first outer air gap 340a.1/340a.4 is arranged between the first outer leg 320a.1/320a.4 of the first/second choke core element E1/E4 and the first/second transformer core element E2/E3 and a second outer air gap 340b.1, 340b.4 is arranged between the second outer leg 320b.1/320b.4 of the first/second choke core element E1/E4 and the first/second transformer core element E2/E3.

Likewise the air gap in a flux path between the first transformer core element E2 and the second transformer core element E3 is distributed to a centre air gap 341.23, arranged between the centre legs 321.2. 321.3 of the first transformer core element E2 and the second transformer core element E3, a first outer air gap 340a.23, arranged between the first outer leg 320a.2 of the first transformer core element E2 and the first outer leg 320a.3 of the second transformer core element E3 and a second outer air gap 340b.23, arranged between the second outer leg 320b.2 of the first transformer core element E2 and the second outer leg 320b.3 of the second transformer core element E3.

Figure 12:
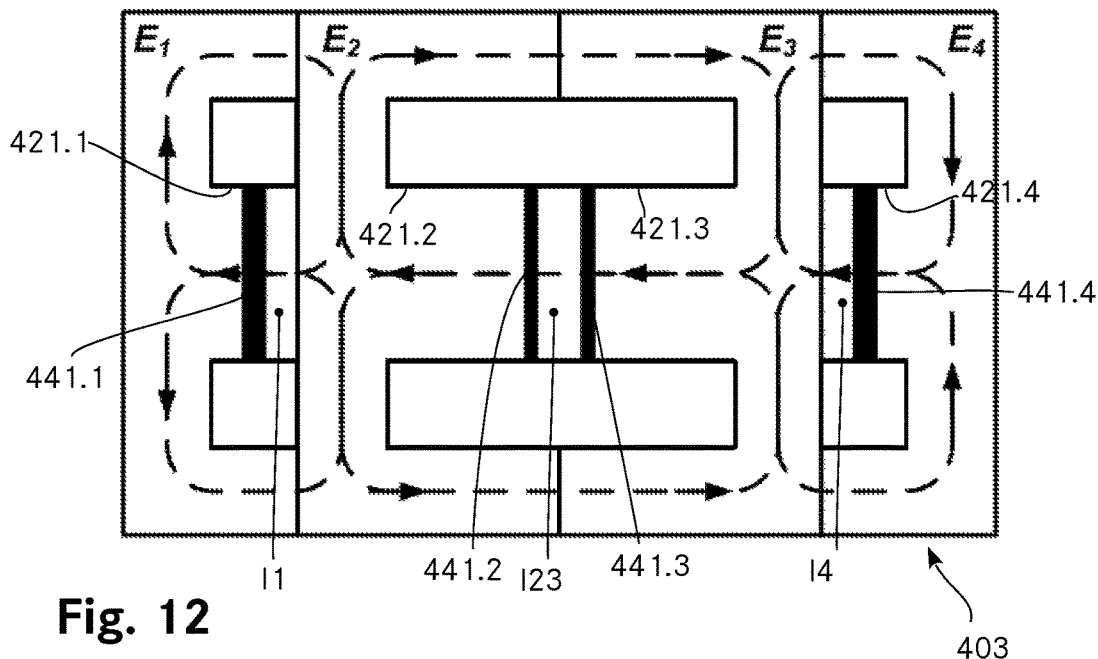
FIG. 12 is a schematic diagram of a forth embodiments of the invention, built up of stacked EE cores or similar three-leg cores for integrated magnetic components in FIG. 4 and FIG. 8, differing by the arrangement of the air gaps in the longitudinal flux paths.

FIG. 12 shows a forth embodiment of an integrated magnetic component 403 according to the invention. The arrangement of the transformer core elements E2 and E3 and the choke core elements E1, E4 is similar to the arrangements of the previous embodiments; however, in the embodiment of FIG. 12, the air gaps are distributed along the centre legs of the respective core elements to reduce AC losses in windings. The air gap between the centre legs 421.2, 421.3 of the transformer core elements E2, E3 is sectioned by an inserted I-core piece 123, defining a first centre air gap 441.2 between the centre leg 421.2 of the first transformer core element E2 and the I-core piece 123 and a second centre air gap 441.3 between the centre leg 421.3 of the second transformer core element E3. A third air gap 441.1 in the flux path between the first choke core element E1 and the first transformer core element is defined by a distance between the centre leg 421.1 of the first choke element and an I-core piece I1 abutting the flange of the first transformer core element E2, likewise a forth air gap 441.4 in the flux path between the second choke core element E4 and the second transformer core element E3 is defined by a distance between the centre leg 421.4 of the first choke element and a third I-core piece 14 abutting the flange of the second transformer core element E3.

Figures 13, 14:
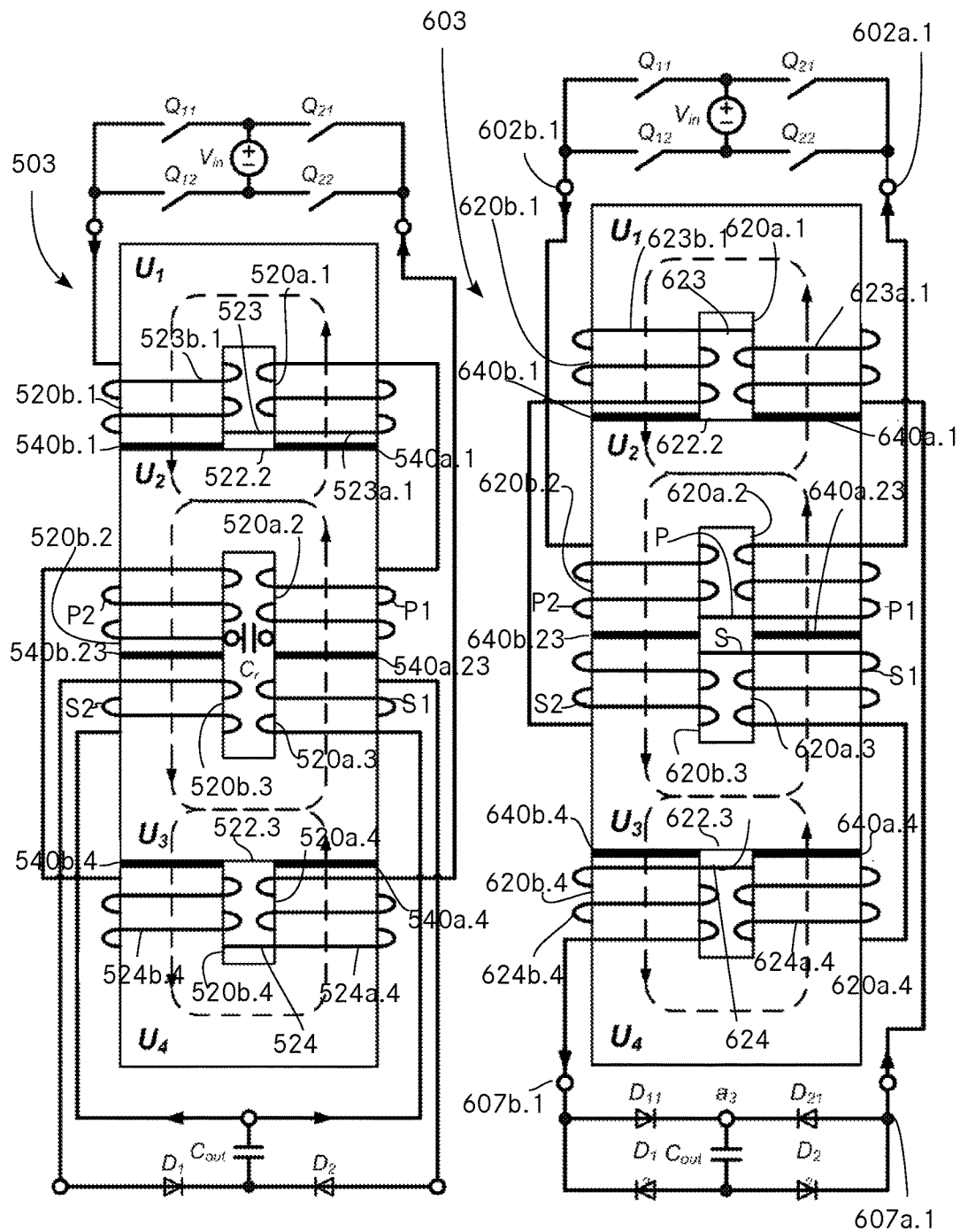
FIG. 13 is a schematic diagram of a fifth embodiment of an integrated magnetic component according to this invention; the integrated magnetic component comprising four U cores or similar two-leg cores stacked in parallel, for the LLC resonant converter as shown in FIG. 3.
FIG. 14 is a schematic diagram of a sixth embodiment of an integrated magnetic component according to this invention; the integrated magnetic component comprising four U cores or similar two-leg cores stacked in parallel, for the soft switching converter as shown in FIG. 7.

FIG. 13 and FIG. 14 show another two other embodiments of the invention. Both embodiments have the same magnetic core structure, using 4 U-shaped core elements, each comprising a flange, a first outer leg and a second outer leg. The U-shaped core elements are: A first transformer core element U2, a second transformer core element U3, a first choke core element U1 and a second choke core element U4. Each of those core elements comprises a first and a second outer leg. The following description of the magnetic core elements applies to both embodiments, respectively to FIGS. 13 and 14; however the third digit of the reference numerals in the text above has to be increased by one when relating to FIG. 14.

The two transformer core elements U2 and U3 are facing each other with their first outer legs 520a.2, 520a.3 and their second outer legs 520b.2, 520b.3 and form an O-like shaped transformer core. A first transformer air gap 540a.23 is arranged between the first two outer legs 520a.2, 520a.3 of the first transformer core element U2 and the second transformer core element U3. A second transformer air gap 540b.23 is arranged between the second two outer legs 520b.2, 520b.3 of the first transformer core element U2 and the second transformer core element U3.

The first choke-core element U1 is stacked on a flange 522.2 of the first transformer core element U2, such that it's first outer leg 520a.1 and its second outer leg 520b.1 are abutting the flange 522.2 of the first transformer core element U2 on the side opposite to the outer legs 520a.2, 520b.2 of the first transformer core element U2.

A first choke air gap 540a.1 is placed between the flange 522.2 of the first transformer core element U2 and the first outer leg 520a.1 of the first choke core element U1. Also a second choke air gap 540b.1 is placed between the flange 522.2 of the first transformer core element U2 and the second outer leg 520b.1 of the first choke core element U1.

A third choke air gap 540a.4 is placed between the flange 522.3 of the second transformer core element U3 and the first outer leg 520a.4 of the second choke core element U4. In addition, a forth choke air gap 540b.4 is placed between the flange 522.3 of the second transformer core element U3 and the second outer leg 520b.4 of the second choke core element U4.

The embodiment of the integrated magnetic component 503 according to FIG. 13 implements the integrated magnetic component of the LLC converter with split resonant chokes according to FIG. 3. It comprises a first and a second resonant choke winding 523, 524, implementing the first and the second resonant inductor Lr1, Lr2 of the equivalent circuit diagram shown in FIG. 3. The first resonant choke winding 523 comprises in series connected first choke winding parts 523a.1 and 523b.1, which are wound around the first outer leg 520a.1 respectively, the second outer leg 520b.1 of the first choke core element core U1. The first choke air gap 540a.1 and the second choke air gap 540b.1 allow for setting the inductance value of the first serial resonant inductor Lr1 and also prevent saturation of the magnetic core. The second resonant choke winding 524 comprises in series connected second choke winding parts 524a.1 and 524b.1 which are wound around the first outer leg 520a.4 respectively the second outer leg 520b.4 of the second choke core element core U4. The third choke air gap 540a.3 and the forth choke air gap 540.4 allow setting the inductance value Lr2 of the second serial resonant inductor Lr2 and also prevent saturation. The primary winding P1 and the secondary winding S1 of the first split transformer 105a (FIG. 3) are wound around the first outer legs 520a.2, 520a.3 of the connected transformer cores U2 and U2. In the same way the primary winding P2 and the secondary winding S2 of the second split transformer 105b (FIG. 3) are wound on the second outer legs 520b.2, 520b.3 of the connected transformer cores U2 and U3. The first transformer air gap 540a.23 and the second transformer air gap 540b.23 set the parallel resonant inductances Lm1 and Lm2 of the equivalent circuit according to FIG. 3. The first resonant choke winding 523 is connected in series to the primary winding P1 of the first split transformer and the second resonant choke winding 524 is connected in series to the primary winding P2 of second transformer. The first resonant choke winding 523 is connected to a first connection 502a point of the integrated magnetic circuit 503 while the second resonant choke winding is connected the a second connection point of the integrated magnetic circuit 503. The free ends of the primary windings P1, P2 of the first and the second split transformer 105a, 105b are connected to the ends of a series resonant capacitor Cr. The winding direction is chooses such that the mutual fluxes in the flanges of the first and the second transformer core element are minimized.

The embodiment of the integrated magnetic component 603 according to FIG. 14 implements the magnetic components of the soft switching converter according to FIG. 7 comprising a primary winding P and a secondary winding S, a parallel inductor Lm and a first serial output inductor Ls1 and a second serial output inductor Ls2.

The integrated magnetic component 603 is very similar to the integrated magnetic component 503 for implementing the LLC resonant converter with split chokes according to FIG. 3. Instead of choke windings 523, 524 connected to the primary parts of a transformer it comprises a first and a second output choke winding 623, 624 connected to a secondary winding S of the transformer, implementing the first and the second serial output inductor Ls1, Ls2 of the equivalent circuit diagram shown in FIG. 7. The first serial output choke winding 623 comprises in series connected first output choke winding parts 623a.1 and 623b.1, which are wound around the first outer leg 620a.1, respectively the second outer leg 620b.1 of the first choke core element core U1. The first choke air gap 640a.1 and the second choke air gap 640b.1 allow setting the inductance value of the first serial output inductor Ls1 and also prevent saturation. The second output choke winding 624 comprises in series connected second output choke winding parts 624a.1 and 624b.1 which are wound around the first outer leg 620a.4, respectively the second outer leg 620b.4 of the second choke core element core U4. The third choke air gap 640a.3 and the forth choke air gap 640.4 allow setting the inductance value of the second serial output inductor Ls2 and also prevent saturation.

The primary winding P is split in a first part P1 and a second part P2 connected in series. For clearer illustration in FIG. 14 the first part P1 is only wound around the first outer leg 620a.2 and the second part P2 is wound around the second outer leg 620b.2 of the first transformer core element U2. In the same way the secondary winding S of the transformer is split in a first part S1 and in a second part S2, the first part S1 is wound around the first outer leg 620a.3 and the second part S2 is wound around the second outer leg 620b.3 of the second transformer core element U3.

Preferably however the first part P1 of the primary winding P and the first part S1 of the secondary winding S are wound simultaneously around the first outer leg 620a.2 of the first transformer core element U2 and the first outer leg 620a.3 of the second transformer core element U3, the windings of the first part P1 of the primary winding P and the first part S1 of the secondary winding S being arranged in layers.

Likewise, the second part P2 of the primary winding P and the second part S2 of the secondary winding S are simultaneously wound around the second outer leg 620b.2 of the first transformer core element U2 and around the second outer leg 620b.3 of the second transformer core element U3, the windings of the second part P2 of the primary winding P and the second part S2 of the secondary winding being arranged in layers.

The first transformer air gap 640a.23 and the second transformer air gap 640b.23 set the parallel resonant inductances Lm1 and Lm2 of the equivalent circuit according to FIG. 7.

The first output choke winding 623 is connected with a free end of the first winding part 623a.1 to a first load connection point 607a and with a free end of the second winding part 623b.1 to the first split primary winding S1. Likewise the second output choke winding 624 is connected with a free end of the of the first winding part 624a.4 to a second load connection point 607b and with a free end of the second winding part 624b.4 to the first split secondary winding S2. The winding direction is chosen such that the mutual fluxes in the flanges 622.2 and 622.3 of the first and the second transformer core elements are minimized. The split primary winding P is connected to connection points 602a, 602b for connection of a soft switching converter, comprising a full bridge with the switches Q11, Q12, Q21, and Q22.

Figures 15, 16:
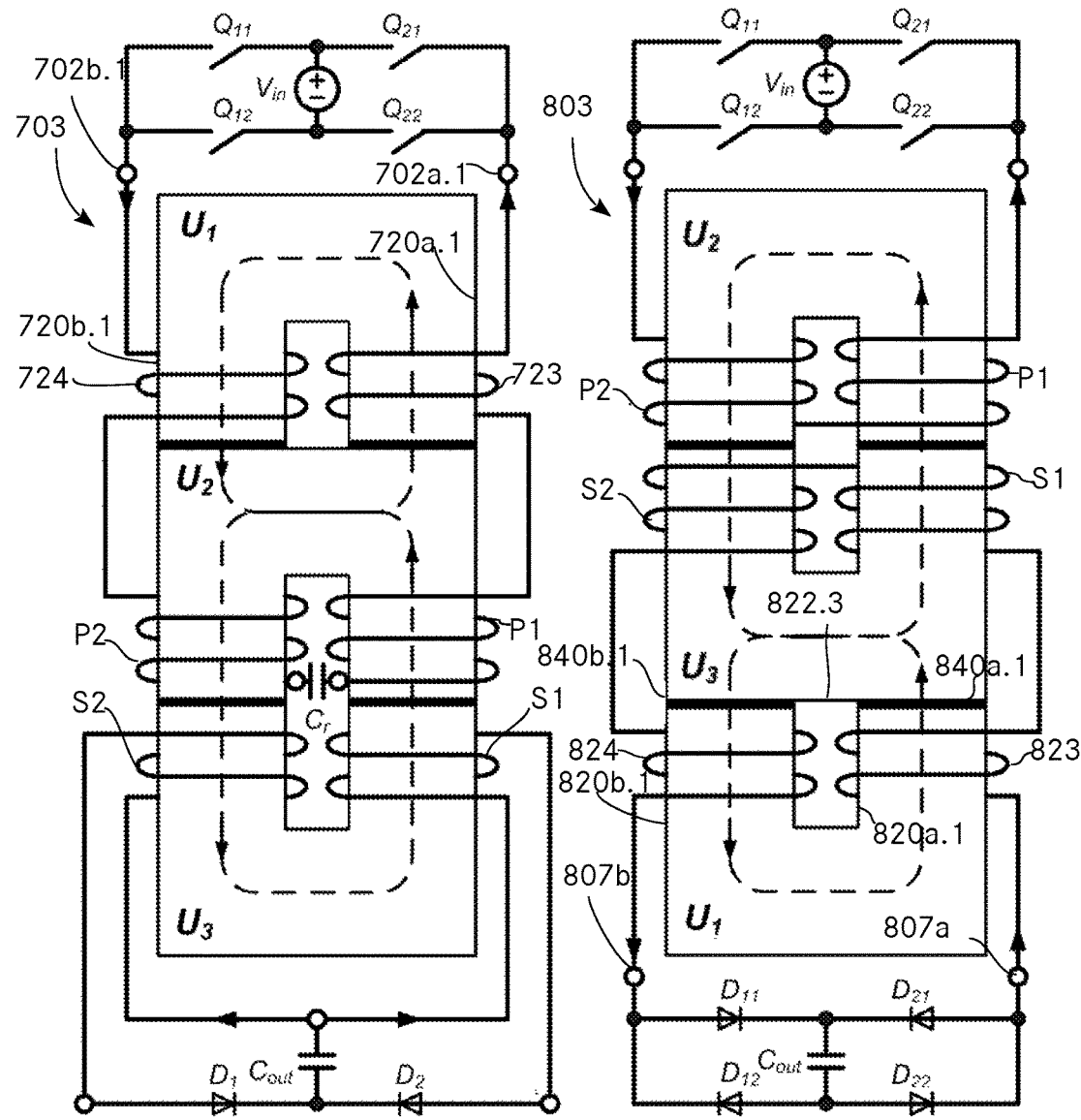
FIG. 15 is a schematic diagram of a seventh preferred embodiment of the integrated magnetic component according to the invention, the integrated magnetic component comprising three U cores or similar two-leg cores stacked in parallel, for an LLC resonant according to FIG. 3.
FIG. 16 is a schematic diagram of an eight preferred embodiment of the integrated magnetic component according to the invention, with three U cores or similar two-leg cores stacked in parallel; for a soft switching converter as shown in FIG. 7.

A fifth embodiment of the invention is shown in FIG. 15. This embodiment of the integrated magnetic circuit 703 also implements the magnetic components of the LLC resonant circuit according to FIG. 3. It uses three U-shaped core elements, each comprising a flange, a first outer leg and a second outer leg. The magnetic core structure corresponds to the magnetic core structure of the embodiment shown in FIG. 13, however, it does not comprise a second choke core element, but only a first and a second transformer core element U2 and U3 and a first choke core element U1. The first resonant choke winding 723 is wound around a first outer leg 720a.1 of the first choke core element U1, the second choke winding 724 is wound around the same choke core element U1, but around the second outer leg 720b.1 of the first choke core element U1. The first choke core winding 723 is connected with one end to a first input connection point 702a, with the other end to a free end of the first primary winding P1 of the first split transformer 105a (FIG. 3). The second choke core winding 724 is connected with one end to a second input connection point 702b, with the other end to a free end of the second primary winding P2 of the second split transformer 105a (FIG. 3). The arrangement of the transformer windings is identical to the arrangement of the transformer windings of the third embodiment of the integrated magnetic component 503, shown in FIG. 4. To sum up: In contrast to the integrated magnetic component 504 according to FIG. 13, the series resonant inductance of the integrated magnetic component 703 according to FIG. 15 is not split over two different core elements, consequently it reduces the number of total core elements and, therefore, also costs.

FIG. 16 displays a sixth embodiment of an integrated magnetic circuit 803 according to the invention. Like the previous embodiment of the integrated magnetic component 703, the integrated magnetic component 803 comprises 3 U-shaped core elements, but it implements the magnetic components of the schematic diagram of the soft switching converter shown in FIG. 7. The arrangement of the transformer core elements U2 and U3 and the transformer winding P1, P2, S1, S2 is the same as in the embodiment shown in FIG. 14, including the connections between the transformer windings P1, S1, P2, S2. Consequently the primary winding parts P1 and P2 are connected in series and also the secondary winding parts S1 and S2 are also connected in series. For certain design specifications primary winding parts P1 and P2 can be connected in parallel. This also applies to secondary winding parts S1 and S2.

The integrated magnetic component 803 comprises only one choke core element U1 which is stacked on the flange 822.3 of the second transformer core element U3, similarly to the second choke core element U4 of the integrated magnetic component 603 being stacked on flange of the second transformer core element U3, as shown in FIG. 14. The first output choke winding 823 is wound around the first outer leg 820a.1 of the first choke core element and connected with a first end to a first load connection point 807a and with a second end to a free end of the first part of the secondary winding S1 of the transformer. The second choke winding 824 is wound around the second outer leg 820b.1 of the first choke core element U1, a free end being connected to the second load connection point 807b and with another end to the free end of the second part S2 of the secondary winding. Consequently, the series output inductance Ls is not split over two different choke core elements but over two different legs of one choke core element. A first choke air gap 840a.1 and a second choke air gap 840b.1 between the first choke core element U1 and the second transformer core element U2, set the inductance values of LS1 and LS1, and prevent core saturation.

The proposed integrated magnetic components depicted in FIG. 13 to FIG. 16, employing three U cores respectively four U-cores, can also be built using other basic core elements as building blocks then U-cores. The following examples show how an integrated magnetic component using three U-cores can be constructed by means of U-shaped and I-shaped base elements.

In FIG. 17a the first U-shaped choke core element $U_1$ is constructed by an I-core base element 950 and the legs of a U-core base element 951 facing the I-core base element 950 with its legs, the legs defining the first outer leg 920a.1 and the second outer leg 920b.1 of the first U-shaped choke core element $U_1$. The I core base element 950 defines the flange 922.1 of the first choke core element $U_1$. The flange of the U-core base element 951 represents the flange 922.2 of the first transformer core element $U_2$.

In FIG. 17b an I-core base element 952 defines the flange 922.2 of the first transformer core element $U_2$, whereas the ends of the outer legs 954 of a U-core base element 953 define the legs of the first transformer core element $U_2$.

In FIG. 17c an I-core base element 955 defines the flange 922.3 of the second transformer core element $U_3$, whereas the ends of the outer legs 957 of a U-core base element 956 define the legs of the second transformer core element $U_3$.

In summary, it is to be noted that the invention creates an integrated magnetic component for switching power supplies allowing integrating more inductive components, having improved power density and therefore reduces core losses. The invention further creates a switched mode power converter including such a magnetic component and a corresponding method.

The invention claimed is:

1. An integrated magnetic component for a switched mode power converter, including a transformer comprising two transformer core elements, the integrated magnetic component further including at least one choke core element, each of said transformer and choke core elements including a first and a second outer leg and a flange connecting the outer legs to form U-like core elements, the transformer core elements being arranged to form an O-like core element, each choke core element abutting a flange of exactly one of the transformer core elements, the transformer comprising a primary winding and a secondary winding arranged on a leg of the transformer core elements, the transformer includes a first air gap arranged in a flux path between the transformer core elements, the integrated magnetic component further includes at least a second air gap in a flux path between a transformer core element and a choke core element, wherein the integrated magnetic component includes a first choke winding arranged on a leg of a choke core element and a second choke winding arranged on another leg of a choke core element, where one of the primary and the secondary winding is connected in series between the choke windings and where all windings are interconnected to reduce core losses by flux compensation in order to increase power density, wherein the choke and transformer windings are arranged on the outer legs of respective core elements, wherein at least one of the choke or the transformer windings is divided in a first and a second winding part, at least one of the choke or transformer windings or at least one of the first winding parts being arranged on at least one of the first outer legs while at least another one of the choke or transformer windings or at least one of the second winding parts being arranged on the second outer leg which is opposite to said at least one first outer leg, and where both of said choke or transformer windings or winding parts are connected in series and are having the same number of turns and a winding direction, such that a current through said serial connected windings or winding parts causes magnetomotive forces which are acting in the same direction.

2. The integrated magnetic component according to claim 1 comprising at least two choke core elements, the second air gap being in the flux path between the transformer core element and a first of said choke core elements, the integrated magnetic component includes at least a third air gap being in a flux path between the other of said transformer core elements and a second of said two choke core elements, the first choke winding being arranged on this first choke core element and the second choke winding being arranged on the second choke core element in order to reduce air gap fringing fields by splitting the choke windings over the two choke cores elements.

3. The integrated magnetic component according claim 1, wherein each core element further comprises a center leg which is arranged in between the outer legs of said core element, such that the outer legs, the center leg and the flange of each core element form an E-like shape, and wherein the center legs of the transformer core elements are facing each other, such that the two transformer core elements form an 8-like-shaped core element, the center leg of each choke core element abutting the flange of the adjacent transformer core element on the side opposite to the center leg of said adjacent transformer core element.

4. The integrated magnetic component according to claim 3, wherein the transformer windings are wound around the center legs of the transformer core elements, and the choke windings are wound around the center legs of the choke cores elements.

5. The integrated magnetic component according to claim 1, wherein the choke windings and the transformer winding which is connected between the first and the second choke winding are realized with a single wire to avoid additional lead-outs between the windings.

6. The integrated magnetic component according to claim 1, wherein the primary winding and/or the secondary winding of the transformer are split into a first split transformer winding and a second split transformer winding, a first end of said first split transformer winding being connected to a first end of an electronic component and a first end of said second split transformer winding being connected to a second end of said electronic component, the second ends of said split transformer windings being connected to the first choke winding, the second end of said second split transformer winding being connected to the second choke winding.

7. The integrated magnetic component according to claim 1, wherein at least one of the air gaps is arranged in parallel to the flanges of the core elements of the integrated magnetic component.

8. The integrated magnetic component according to claim 1, wherein the air gaps are arranged in between the respective abutting core elements.

9. The integrated magnetic component according to claim 2, the arrangement of the transformer core elements and the choke core elements being mirror symmetrical in respect to an axis parallel to the flanges of the core elements, in particular the air gaps being symmetrical to said axis.

10. A switched mode power converter, including the integrated magnetic component according to claim 1.

11. The switched mode power converter according to claim 10, wherein the switched mode power converter is a LLC resonant converter.

12. The switched mode power converter according to claim 10, wherein the switched mode power converter is a soft switching converter.

13. The integrated magnetic component according to claim 6, wherein the electronic component is a capacitive element.

14. An integrated magnetic component according to claim 1, wherein the transformer and choke core elements are U-core elements with no center legs.

15. An integrated magnetic component for a switched mode power converter, including a transformer comprising two transformer core elements, the integrated magnetic component further including at least one choke core element, each of said core elements including a first and a second outer leg and a flange connecting the outer legs to form U-like core elements, the transformer core elements being arranged to form an O-like core element, each choke core element abutting a flange of one of the transformer core elements, the transformer comprising a primary winding and a secondary winding arranged on a leg of the transformer core elements, the transformer includes a first air gap arranged in a flux path between the transformer core elements, the integrated magnetic component further includes at least a second air gap in a flux path between a transformer core element and a choke core element, wherein the integrated magnetic component includes a first choke winding arranged on a leg of a choke core element and a second choke winding arranged on another leg of a choke core element, where one of the primary and the secondary winding is connected in series between the choke windings and where all windings are interconnected to reduce core losses by flux compensation in order to increase power density and in that the choke windings and the transformer winding which is connected between the first and the second choke winding are realized with a single wire to avoid additional lead-outs between the windings, wherein the choke and transformer windings are arranged on the outer legs of respective core elements, wherein at least one of the choke or the transformer windings is divided in a first and a second winding part, at least one of the choke or transformer windings or at least one of the first winding parts being arranged on at least one of the first outer legs while at least another one of the choke or transformer windings or at least one of the second winding parts being arranged on the second outer leg which is opposite to said at least one first outer leg, and where both of said choke or transformer windings or winding parts are connected in series and are having the same number of turns and a winding direction, such that a current through said serial connected windings or winding parts causes magnetomotive forces which are acting in the same direction.

16. An integrated magnetic component for a switched mode power converter, including a transformer comprising two transformer core elements, the integrated magnetic component further including at least one choke core element, each of said transformer and choke core elements including a first and a second outer leg and a flange connecting the outer legs to form U-like core elements, the transformer core elements being arranged to form an O-like core element, each choke core element abutting a flange of one of the transformer core elements, the transformer comprising a primary winding and a secondary winding arranged on a leg of the transformer core elements, the transformer includes a first air gap arranged in a flux path between the transformer core elements, the integrated magnetic component further includes at least a second air gap in a flux path between a transformer core element and a choke core element, wherein the integrated magnetic component includes a first choke winding arranged on a leg of a choke core element and a second choke winding arranged on another leg of a choke core element, where one of the primary and the secondary winding is connected in series between the choke windings and where all windings are interconnected to reduce core losses by flux compensation in order to increase power density, the integrated magnetic component further comprising at least two choke core elements, the second air gap being in the flux path between a transformer core element and a first of said choke core elements, the integrated magnetic component includes at least a third air gap being in a flux path between the other of said transformer core elements and a second of said two choke core elements, the first choke winding being arranged on this first choke core element and the second choke winding being arranged on the second choke core element in order to reduce air gap fringing fields by splitting the choke windings over the two choke cores elements.

* * * * *